(12) United States Patent
Hinders et al.

(10) Patent No.: US 8,256,219 B2
(45) Date of Patent: Sep. 4, 2012

(54) METHODS FOR ENHANCING EFFICIENCY OF STEAM-BASED GENERATING SYSTEMS

(75) Inventors: Edward B. Hinders, San Antonio, TX (US); Patrick J. Kelly, Fairview, TX (US)

(73) Assignee: Canyon West Energy, LLC, Canyon, TX (US)

( * ) Notice: Subject to any disclaimer, the term of this patent is extended or adjusted under 35 U.S.C. 154(b) by 627 days.

(21) Appl. No.: 12/333,658

(22) Filed: Dec. 12, 2008

(65) Prior Publication Data
US 2010/0043435 A1    Feb. 25, 2010

Related U.S. Application Data

(60) Provisional application No. 61/090,092, filed on Aug. 19, 2008.

(51) Int. Cl.
*F03G 7/00* (2006.01)
*F01K 25/06* (2006.01)

(52) U.S. Cl. .......... 60/641.2; 60/641.8; 60/649; 60/660; 290/1 R

(58) Field of Classification Search .... 60/641.1–641.15, 60/649, 660; 290/1 R
See application file for complete search history.

(56) References Cited

U.S. PATENT DOCUMENTS

| | | | |
|---|---|---|---|
| 2,875,986 A | 3/1959 | Holm | |
| 3,159,178 A | 12/1964 | Adams | |
| 3,459,953 A | * 8/1969 | Brauser et al. | 290/2 |
| 3,542,124 A | 11/1970 | Manfredo | |
| 3,822,740 A | 7/1974 | Hackett | 165/45 |
| 3,950,949 A | 4/1976 | Martin et al. | |
| 3,986,362 A | 10/1976 | Baciu | |
| 4,131,159 A | 12/1978 | Long | |
| 4,144,715 A | 3/1979 | Fleck et al. | |

(Continued)

FOREIGN PATENT DOCUMENTS

WO    WO 2006/029112    3/2006

(Continued)

OTHER PUBLICATIONS

White Paper published by CogenerationTechnologies; "Combined Cycle Power Plants"; 5 pp.; Copyright 1999; www.cogeneration.net/Combined_Cycle_Power_Plants.htm.

(Continued)

*Primary Examiner* — Hoang Nguyen
(74) *Attorney, Agent, or Firm* — Whitaker Chalk Swindle & Schwartz PLLC; Stephen S. Mosher

(57) ABSTRACT

A system, apparatus and method for generating electricity from renewable geothermal, wind, and solar energy sources includes a heat balancer for supplementing and regulating the heat energy fed to a turbine generator; a hydrogen-fired boiler for supplying supplementary heat; and an injection manifold for metering controlled amounts of superheated combustible gas into the working fluids to optimize efficiency.

Wind or solar power may be converted to hydrogen in an electrolysis unit to produce hydrogen. A phase separator unit that operates by cavitation of the geothermal fluids removes gases from the source fluid. A pollution prevention trap may be used to remove solids and other unneeded constituents of the geothermal fluids to be stored or processed in a solution mining unit for reuse or sale. Spent geothermal and working fluids may be processed and injected into the geothermal strata to aid in maintaining its temperature or in solution mining of elements in the lithosphere.

11 Claims, 13 Drawing Sheets

U.S. PATENT DOCUMENTS

| | | | |
|---|---|---|---|
| 4,230,531 A | | 10/1980 | Fernandopulle |
| 4,249,595 A | | 2/1981 | Butt |
| 4,342,197 A | | 8/1982 | Matthews |
| 4,354,551 A | | 10/1982 | Kristoffersson et al. |
| 4,841,731 A | * | 6/1989 | Tindell .......................... 60/641.8 |
| 5,038,567 A | | 8/1991 | Mortiz |
| 5,050,671 A | | 9/1991 | Fletcher |
| 5,272,874 A | | 12/1993 | Paas |
| 5,279,260 A | | 1/1994 | Munday |
| 5,311,741 A | | 5/1994 | Blaize |
| 5,312,699 A | | 5/1994 | Yanagi et al. |
| 5,442,921 A | | 8/1995 | Chow et al. |
| 5,592,028 A | | 1/1997 | Pritchard |
| 5,661,977 A | | 9/1997 | Schnell .......................... 60/641.2 |
| 5,664,419 A | | 9/1997 | Kaplan |
| 5,941,238 A | | 8/1999 | Tracy ............................. 126/641 |
| 6,100,600 A | | 8/2000 | Pflanz ............................. 290/54 |
| 6,187,079 B1 | | 2/2001 | Bridger ............................ 96/179 |
| 6,211,643 B1 | | 4/2001 | Kagatani |
| 6,279,321 B1 | * | 8/2001 | Forney ........................ 60/641.11 |
| 6,695,043 B1 | | 2/2004 | Wagner et al. |
| 6,920,920 B2 | | 7/2005 | Whittenberger |
| 6,935,417 B1 | | 8/2005 | Inoue et al. |
| 7,165,615 B2 | | 1/2007 | Vinegar et al. |
| 7,178,337 B2 | | 2/2007 | Pflanz ........................... 60/641.2 |
| 7,211,906 B2 | | 5/2007 | Teets et al. |
| 7,331,179 B2 | | 2/2008 | Balan et al. |
| 7,340,893 B1 | * | 3/2008 | Rowan ............................. 60/495 |
| 7,891,188 B2 | | 2/2011 | Zachar |
| 7,942,001 B2 | | 5/2011 | Radcliff et al. |
| 2002/0148602 A1 | | 10/2002 | Nakamura |
| 2003/0010652 A1 | | 1/2003 | Hunt |
| 2004/0020642 A1 | | 2/2004 | Vinegar et al. |
| 2004/0258192 A1 | * | 12/2004 | Angeliu et al. ................ 376/305 |
| 2005/0269078 A1 | | 12/2005 | Morgenthaler |
| 2006/0010868 A1 | | 1/2006 | Smith |
| 2006/0266501 A1 | | 11/2006 | So et al. |
| 2006/0279088 A1 | | 12/2006 | Miller et al. |
| 2007/0056164 A1 | | 3/2007 | Whittenberger |
| 2007/0138022 A1 | | 6/2007 | Peter et al. |
| 2007/0138797 A1 | | 6/2007 | Reidy et al. |
| 2007/0259119 A1 | | 11/2007 | Shen |
| 2008/0067893 A1 | | 3/2008 | Peacock |
| 2008/0078316 A1 | | 4/2008 | Gizara |
| 2008/0078435 A1 | | 4/2008 | Johnson |
| 2009/0289457 A1 | | 11/2009 | Gleasman |
| 2009/0320475 A1 | | 12/2009 | Parrella |
| 2010/0243222 A1 | | 9/2010 | Reinders |
| 2010/0258449 A1 | | 10/2010 | Fielder |
| 2010/0300093 A1 | | 12/2010 | Doty |

FOREIGN PATENT DOCUMENTS

| | | |
|---|---|---|
| WO | 2006/097494 A1 | 9/2006 |

OTHER PUBLICATIONS

Report, U.S. Department of Energy; "Concentrating Solar Power: Energy from Mirrors"; 8 pp; Mar. 2001; No. DOE/GO-102011-1147, FS 128; www.nrel.gov/docs/fy01sti/28751.pdf.

Bronicki, Lucien Y.; "Geothermal Power Stations"; Acadmic Press; Encyclopedia of Physical Science and Technology, 3rd Edition, vol. 6; 12 pages; Copyright 2002.

Erdlac, Richard, et al.; "Geothermal Electric Power Projects in Texas"; Texas Renewable '05, Hilton University of Houston—Houston; 16 pages; Nov. 13-15, 2005; www.utpd.edu/ceed/index.htm.

Talbot, David; "Cheap Hydrogen Fuel"; 3 pages; Technology Review published by MIT; Copyright 2006.

News Release: "Experimental 'Wind to Hydrogen' System Up and Running"; National Renewable Energy Laboratory; 1 page; Jul. 25, 2008; www.nrel.gov/news/press/2006.

Leighty, W.; "Running the World on Renewables: Hyrdogen Transmission Pipelines with Firming Geologic Storage"; Technical Conference Paper; Solution Mining Reseach Institute; 24 pages; Apr. 29-May 1, 2007; www.solutionmining.org.

Kaplan, Uri; "Organic Rankine Cycle Configurations"; Proceedings European Geothermal Congress 2007; pp. 1-5; Apr. 16, 2007.

Wikipedia Article; "Heat Exchanger"; pp. 1-10; Apr. 29, 2008; en.wikipedia.org.

Article: Geothermal Resources in Iceland; "The Reykjavik Heating and Electricity Plan"; pp. 1-2; Nov. 12, 2008; www.energy.rochester.edu.

MIT News Office; "Major Discovery from MTI primed to unleash solar revolution"; pp. 1-3; Nov. 25, 2008; www.mit.edu.newsoffice/2008.

Schlumberger, Oilfield Glossary; "separator"; 2 pages; copyright 2008; www.glossary.oilfield.slb.com.

Hughes, William L., "Energy Storage Using High-Pressure Electrolysis and Methods of Reconversion"; Article; 7 pages; Oklahoma State University, Stillwater Oklahoma, 1974.

Matthew L. Wald; "Expanding Use of Wind Power Feasible, But May Be Costly"; The New York Times newspaper; 2 pages; Jan. 21, 2010 http://www.nytimes.com/2010/01/21/business/energy-environment/21wind.html . . . .

* cited by examiner

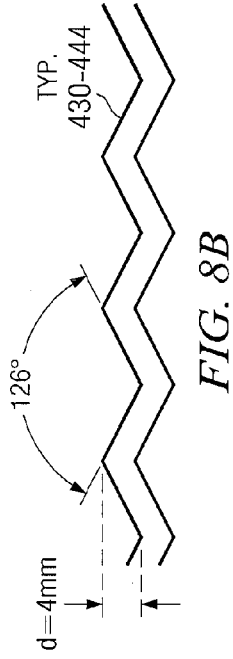
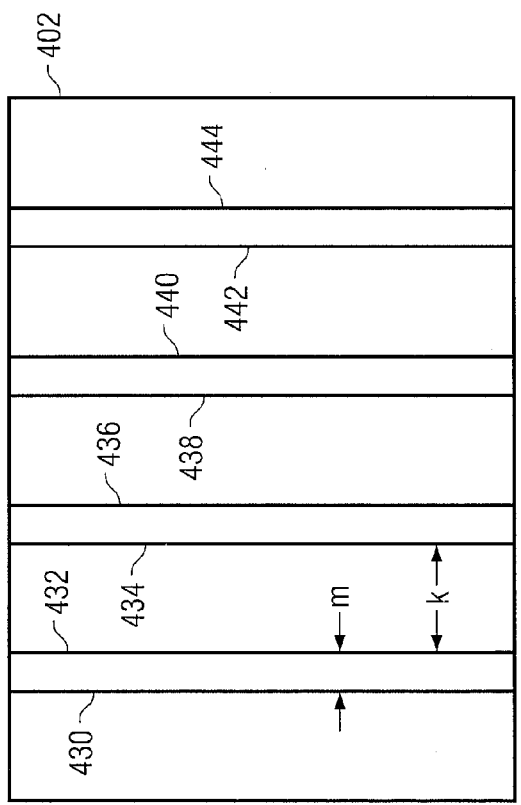
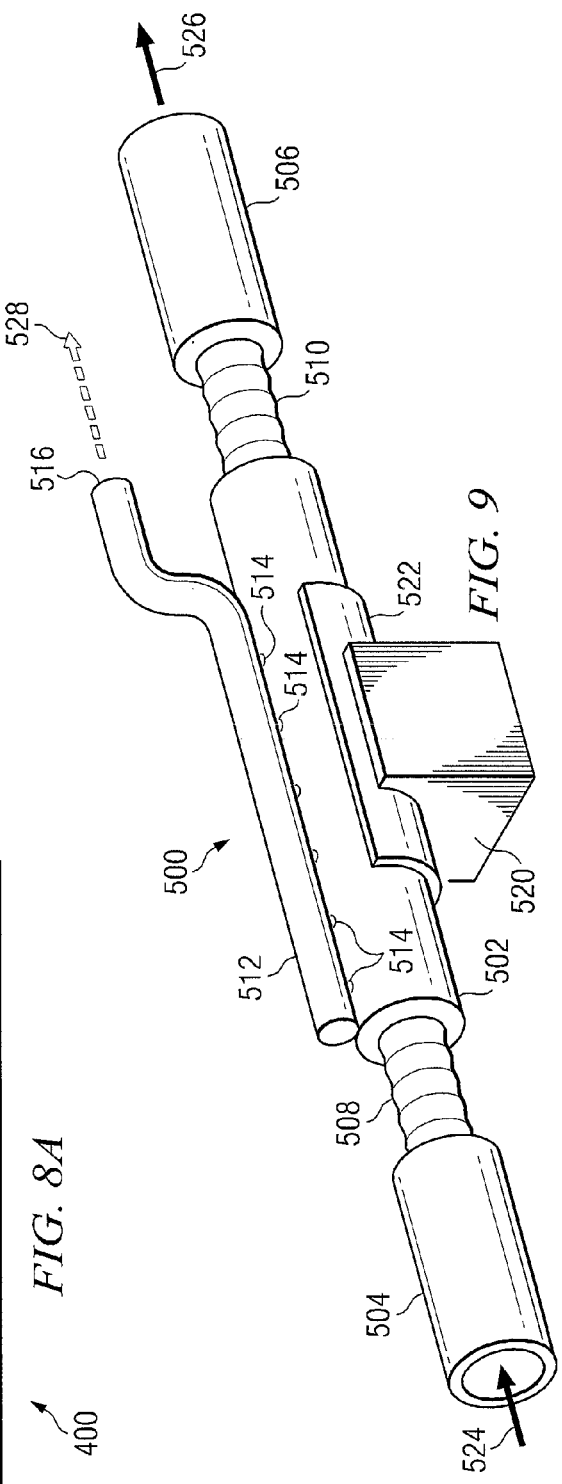

METHODS FOR ENHANCING EFFICIENCY OF STEAM-BASED GENERATING SYSTEMS

CROSS REFERENCE TO RELATED APPLICATIONS

The present U.S. patent application is related to the following co-pending U.S. patent applications entitled: Renewable Energy Electric Generating System; Heat Balancer for Steam-based Generating Systems; Cavitation Phase Separators for Steam-based Generating Systems; and Steam-based Electric Power Plant Operated on Renewable Energy. The present and foregoing related patent applications claim priority from U.S. Provisional Patent Application No. 61/090,092, filed Aug. 19, 2008 and entitled Electric Power Generation System Utilizing Multiple Renewable Energy Resources, by the same inventors.

BACKGROUND OF THE INVENTION

1. Field of the Invention

The present invention generally relates to electric power generation using renewable sources of energy, and more particularly to enhanced uses of wind or solar energy in combination with geothermal fluids originating in hot strata of the earth's mantle as a source of heat for operating steam-driven turbine generators. The system, apparatus, and methods disclosed herein utilize wind or solar generated electricity, hydrogen gas, and optimized parameter control to exploit the heat energy available from geothermal fluids in providing efficient generation of electric power with a very low carbon footprint and near zero emissions into the atmosphere.

2. Background of the Invention and Description of the Prior Art

Use of the heat energy in geothermal fluids such as dry or wet steam from deep production wells into the earth's mantle ("hydrothermal resources," as described in an article entitled *Geothermal Power Stations*, by Lucien Y. Bronicki, in the *Encyclopedia of Physical Science and Technology*, Third Edition, 2002, Robert A, Meyers, Editor-in-Chief, Volume 6, pp. 709-719.) as a source of heat to drive steam turbine electric generators is an active area for renewable energy development and research. Conventional approaches endeavor to extract as much heat energy as possible from the geothermal fluids before returning them via injection to locations beneath the surface of the earth where the fluids may reacquire heat energy from the hot rock strata.

Conventional electric generating facilities such as natural gas-fired or coal-fired generators are of questionable utility to meet future electricity needs because they burn carbon based "fossil" fuels and oxygen. In addition to having a large and undesirable carbon "footprint," such facilities produce as undesirable byproducts carbon dioxide and nitrous oxide, believed to be among the principle contributors to climate change and air pollution. In addition, these fossil fuel generating facilities are expensive to construct. Nuclear-fueled generators, though having a small carbon footprint and low atmospheric emissions, are extremely expensive to build and operate, and present the additional problems of disposing of the nuclear waste. Nuclear power generating plants are also faced with dissipating large amounts of waste heat. Thus, the prospects of relying on fossil fueled or nuclear fueled electric power plants to meet the future electricity needs of a growing population with minimal effects on the earth's environment at a reasonable cost are unpromising. New ways of generating and distributing electric power must be developed and made available to the distribution grids.

In looking to other sources of energy for generating electricity, particularly renewable sources, one must keep in kind that there are many variables in the generation and distribution of electric power. Demand peaks and ebbs in response to temporal and climate cycles. The output of wind powered generators as shown in FIG. 1 is subject to vide variations in climate conditions. Moreover, the temperature and heat content of geothermal fluids—principally steam, but may also include water and brine solutions of varying composition—varies widely according to geographic and geological diversity, as well as the depth and suitability of production wells. While advances are being made in harnessing the extremely abundant solar energy, inefficiencies and problems of scale continue to challenge development efforts.

In FIG. 1, there is illustrated in simplified form a conventional wind-powered electric generator system 10 that is typical of the prior art. In the system 10, an electric generator 12 is rotated by a wind-driven propeller 14 to generate an electric voltage that is conducted to a distribution grid 16 (not shown) along wires 18. The wires 18 may typically be supported by a plurality of towers 20 spaced at substantially uniform distances to connect the generator output to the distribution grid 16. In a typical wind farm, many such wind generator systems 10 may be employed, their outputs coupled to the distribution grid via direct wires 18 as shown or via wires to a substation (not shown, because it is well known in the art), which in turn may be connected to the distribution grid 16. The elements of such a wind power generating system 10 and distribution grid 16 are well known and will not be further described herein.

In a basic, prior art electric power plant that utilizes geothermal fluids, one example of which is shown in simplified form in FIG. 2, dry steam or high temperature water from geothermal production wells is used to drive a steam turbine and electric generator. The geothermal fluid for use as a working fluid to drive a turbine may be obtained from any deep natural gas, oil, water, geothermal well, etc. having sufficient heat at depth. Note that a working fluid in this context may be either a liquid or a vapor (such as dry steam). In a dry steam plant, the turbine is driven directly by the geothermal steam. In a flash steam plant, high temperature fluids are first vaporized in an expansion chamber at low pressure and the water vapor is used as a working fluid to drive the turbine. Since many production wells produce geothermal fluids of moderate temperature, e.g., less than 200° C., the geothermal fluid may be routed through the primary side of a closed heat exchanger in a third type of power plant called a binary-cycle power plant.

In a binary cycle geothermal power plant, illustrated in basic form in FIG. 2, a second working fluid, such as an organic working fluid that boils at a lower temperature than water, is conducted through the secondary side of the heat exchanger. A few examples of organic working fluids include ammonia, isopentane, isobutane, etc. Heat from the primary side geothermal fluid is transferred to the secondary "organic" working fluid that is used to drive the turbine. A given geothermal power plant may employ one or more turbine/generator combinations. The output of the generator is connected to an electricity grid for distribution and the spent steam is typically injected into the earth via an injection well.

The system 30 shown in FIG. 2 includes an electric generator 32 whose electric output is coupled to the distribution grid 16 via wires 34. The generator receives its driving force from the rotating output shaft 38 of a steam driven turbine 36. The steam driven turbine 36, a well-known structural component, converts high temperature, high pressure steam to the mechanical rotation of its output shaft 38. The steam, also called the working fluid, is applied to an inlet 40 of the steam turbine 36 via a conduit 44, which carries the working fluid in a circulating loop. The working fluid is chosen to have a lower boiling point than the geothermal fluid, which most commonly has a temperature between 150° C. to 200° C., although some hydrothermal deposits may range from under 100° C. to as high as 350° C. The working fluid receives heat energy by passing through a heat exchanger 50, where heat is transferred to the working fluid flowing in conduit 44. This transfer of heat causes the working fluid to vaporize. In the heat exchanger 50, the hotter geothermal fluid flows through internal passages in close proximity to the passages conveying the cooler working fluid to facilitate the transfer of heat into the working fluid. The heat exchanger 50 has a source side 52 and a demand side 54, referring respectively to the source of heat to operate the turbine and to the loading or demand for electricity on the output of the generator 32. The geothermal fluid is obtained from deposits 60 via production wells 62 and pumped by a pump 64 through a conduit 66 and the source side 52 of the heat exchanger 50. After giving up some of its heat in the heat exchanger 50, the cooled geothermal fluid is returned to the Earth via a conduit 76 and an injection well 72 into deposits 70 similar to or adjacent to the original deposits 60.

The use of two separate fluids in the power plant of FIG. 2 enables isolation of the fluid used to drive the turbine 36 from the fluid produced from the production wells 62 and thus gives rise to the term "binary cycle" power plant. A binary cycle power plant thus prevents the often caustic, corrosive, or abrasive substances that may be contained in the geothermal fluid from damaging the internal components of the turbine 36. The working fluid may be water, or low temperature steam, or an organic fluid material such as isobutane, isopentane, propane, or other easier-to-condense hydrocarbons. These organic compounds may be used because of their relatively low boiling points. The geothermal fluid may be high temperature steam, hot water, high temperature brine, a mixture of these fluids, or a mixture containing one or more of these and other elements, minerals, or hydrocarbon compounds.

While these prior art plants can provide electricity from renewable sources with zero emissions, they are subject to inefficiencies and variable outputs because of the variability in temperatures of the geothermal working fluids. Such systems are adequate for steady state electricity loads but are much less suited to meeting the demands for both base loads and peak loads, and levels of demand intermediate base and peak loading. Accordingly there is a need for electric power generation systems that rely on renewable sources and provide electricity output responsive to wide variations in demand despite potentially wide variations in the energy resources from which the electricity is derived. Additionally, it is preferred that the system operate with zero emissions into the atmosphere or into the earth's water resources. Moreover, it is further preferred that the system be configured to operate with improved efficiency and to minimize the waste of heat or unused constituents of the working fluids obtained from the deep wells or other resources.

SUMMARY OF THE INVENTION

Accordingly, there are disclosed herein a system, apparatus and methods for the generation of electricity from geothermal, wind power, and other renewable energy resources as supplemented by hydrogen injection and heat balancing to optimize efficiency. In the present invention, hydrogen gas plays a key role in the heat balancing techniques. Further, the system may provide low power recovery of geothermal fluid constituents for reuse, all while operating with minimal or zero atmospheric emissions and ground water pollution.

In the systems, apparatus and methods to be described herein several techniques are disclosed wherein operating efficiencies can be improved dramatically. One such method is to regulate the density of the working fluid input to the turbines, thus providing a convenient and effective method of regulating the generator output with respect to the loading of the generator. Another is to regulate and provide a constant, optimum temperature of the working fluid input to the turbines, through the use of novel heat balancers. Another is to provide for removing gases from the working fluids through the use of novel cavitation separators. Yet another is to recycle the working fluids to fully utilize the heat energy contained within them or return—i.e., inject—the geothermal fluids to be disposed into the Earth's strata. Further, apparatus and methods are disclosed for recovering unused constituents for reuse or resale, and for reuse or re-balancing spent working fluids to extract useable energy there from. A typical system may also include a pollution prevention trap to ensure against release of substances contrary to regulations.

The present invention addresses the many variables mentioned above by exploiting a combination of renewable geothermal, wind power, and solar power sources. Technology and resources are used in new ways to produce electricity at low cost, with zero or near zero emissions. The system balances variations inherently present in geothermal, wind, and solar sources of energy. The system can efficiently respond to variations in demand and temporal and climatic conditions. A further benefit is the low cost, low power recovery of unused but valuable constituents present in the geothermal fluids used as a source of heat energy. These constituents may be reused, stored, sold, or injected back into the earth. The system operates closed loop, that is, its apparatus and processes are closely regulated and the system gives up little or no energy or emissions to its surroundings.

Accordingly, it is an object of the present invention to provide an electric generating system that operates on renewable energy sources to obtain a very small carbon footprint, to operate with very low emissions, and to provide substantially improved efficiency.

It is a further object of the present invention to provide a more efficient heat balancing apparatus to improve the transfer of heat energy and increase the energy content of the working fluids in a binary cycle power plant.

It is further an object of the present invention to provide a heat balancer that combines an improved heat exchanger and a gas-injection manifold to maximize heat transfer from a source fluid to a demand (working) fluid and to enhance the heat energy content of the source fluid entering the heat balancer.

It is further an object of the present invention to provide for injecting a combustible gas such as hydrogen into the steam turbine working fluid inlet to optimize the energy density of the working fluid.

It is further an object of the present invention to provide a heat balancing apparatus that minimizes the build up of scale in its internal passages, thus prolonging the interval between required maintenance.

It is a further object of the present invention to provide an improved phase separation apparatus that efficiently removes gases from the working fluids of a binary cycle power plant to maximize the efficiency of the working fluid and enable recovery of the removed gases for reuse.

It is a further object of the present invention to provide an apparatus and method for injecting combustible gases such as hydrogen into the working fluid to improve the energy density thereof and to more closely regulate the energy density and content of the working fluids for maximizing efficiency op operation.

It is a further object of the present invention to provide a combination of renewable energy sources and programmable control systems to enable an electric generating system to operate at any level from base load to peak load conditions, even when the demand for electricity encounters wide swings because of time of day, climatic conditions, and consumer uses; and even when renewable energy sources are subject to wide swings in availability because of variations in climate, geographical location, geological temperature conditions, solar radiation, and the like.

It is a further object of the present invention to provide a combination of apparatus for storing renewable energy such as wind and solar-generated electricity.

It is further an object of the present invention to provide hydrogen gas, from electrolysis of water by renewable energy generated electricity, to be stored and utilized to increase the efficacy of working fluids and steam turbines; to provide supplemental heat energy, as in a hydrogen-fired boiler to produce hot, dry steam for use in a binary cycle power plant; and to enable restoration of the pH of working fluids returned to the geothermal strata via injection wells.

It is further an object of the present invention to provide systems and methods for recovery of elemental constituents of geothermal fluids not needed for power plant operation for other commercial uses without emitting or releasing toxic constituents into the atmosphere or geological surroundings.

It is a further object of the present invention to provide an improved binary cycle power plant system having reversible aspects to enable recovery and reuse of heat energy remaining in the working fluids circulating within the closed loop system.

These and other objects are met in the inventions embodied in the renewable energy power plant system, apparatus, and methods disclosed in the following descriptions. In one aspect, a system is provided for generating electricity from a working fluid heated from renewable energy sources comprising a geothermal heat exchanger for transferring heat energy from geothermal fluid to a working fluid; an electrolysis plant for producing hydrogen gas; a boiler heated by the hydrogen gas to produce hot steam; a heat balancer for transferring heat from the hot steam to the working fluid; and a turbine generator that uses the working fluid to generate electricity. The electrolysis plant may be powered by electricity generated from a renewable energy source.

In another aspect, a heat balancer for a geothermal steam turbine generator comprises a heat exchanger having a plurality of separate interleaved passages for respectively a source fluid and a demand fluid; a source fluid manifold system coupled between a source fluid inlet and the respective source fluid passages; and a demand fluid manifold system coupled between a demand fluid inlet and the respective demand fluid passages; wherein the source and demand fluids flow in opposite directions on respective opposite sides of the plates separating the source and demand passages. A gas injection manifold system may be coupled between the source fluid inlet and manifold.

In another aspect, a phase separator is provided comprising a pair of opposing concave half-cylindrical shells; a stacked-element piezoelectric transducer coupled between opposing interior surfaces of the half-cylindrical shells to cause cavitation of the fluid flowing in the conduit; a plurality of fluid conduits attached to exterior surfaces of the half-cylindrical shells; and a drive circuit for exciting the piezoelectric transducer to cause cavitation of the fluid in the conduits. An alternative embodiment provides a phase separator comprising a hollow tubular body having a longitudinal gap formed in one side of the hollow tubular body; a piezoelectric transducer layer laminated to at least a major portion of the interior surface of the hollow tubular body opposite and symmetrical with respect to the gap; a plurality of fluid conduits attached to exterior surfaces of the hollow tubular body; and a drive circuit for exciting the piezoelectric transducer to cause cavitation of the fluid in the conduits.

In another aspect, a method for enhancing the efficiency of a steam-driven turbine generator comprises the steps of providing dry steam of a suitable temperature to an inlet to the turbine generator; supplementing at least one operating parameter of the dry steam with hydrogen gas to optimize efficiency of the turbine generator; monitoring the effect of the at least one operating parameter in the turbine generator; and executing one or more program sequences of a control system to adjust the at least one operating parameter of the system in response to the monitoring step.

In yet another aspect, an electric power plant utilizing heat energy originating as geothermal fluid extracted from a production well to drive a steam-driven turbine generator further comprises a hydrogen-fired boiler to produce hot dry steam to supplement a working fluid driving the turbine generator; an electrolysis plant to produce hydrogen gas to fire the boiler; and a wind powered generator to produce electricity to operate the electrolysis plant. The power plant may further include a heat balancer, a hydrogen injector for regulating the energy density of said working fluid, and a piezoelectric cavitation phase separator.

BRIEF DESCRIPTION OF THE DRAWINGS

FIG. 8 illustrates a view of the edge-wise cross section of a plate having a zig-zag or herringbone pattern as used in the heat balancer of FIGS. 6 and 7;

FIG. 9 illustrates a simplified perspective view of a basic cavitation phase separator according to the present invention for use in the embodiment of FIG. 3;

DETAILED DESCRIPTION OF THE INVENTION

Figure 1:
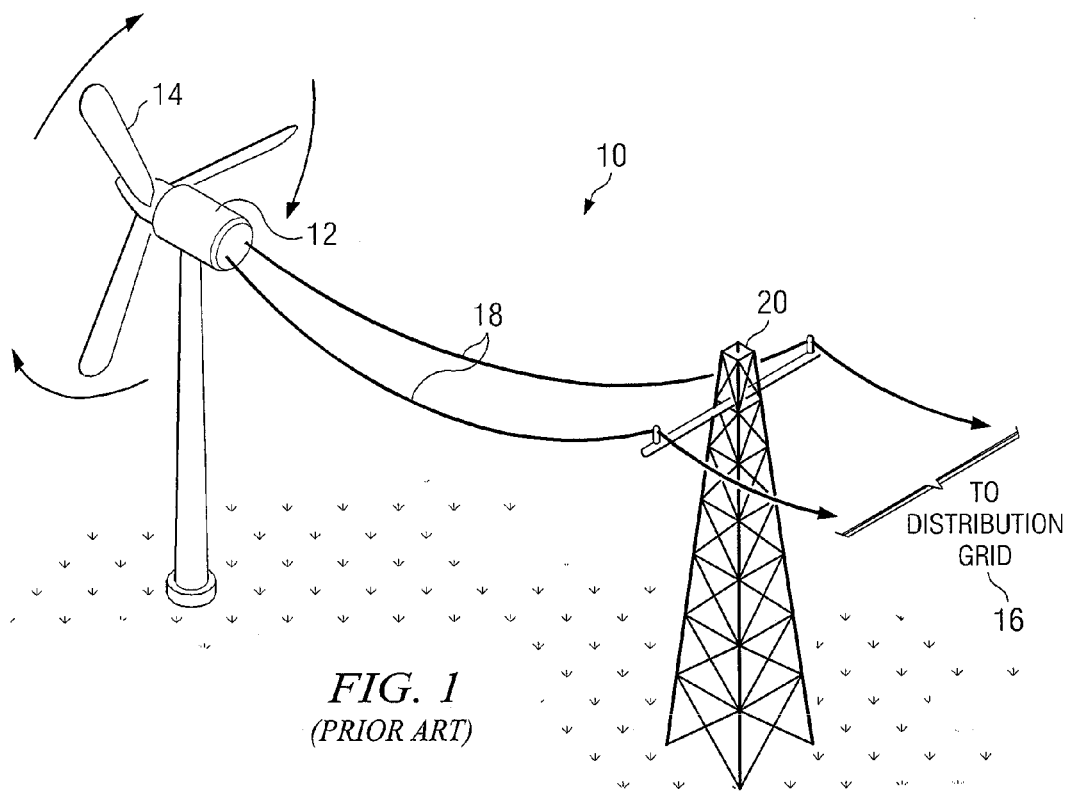
FIG. 1 illustrates a conventional wind-powered electric generator.
Figure 2:
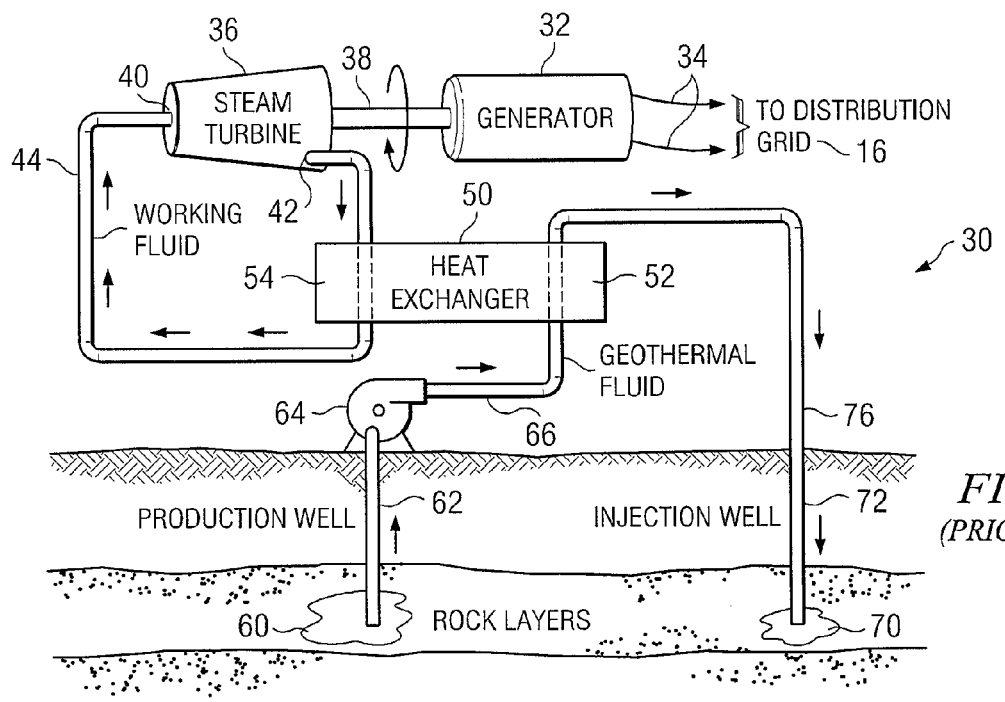
FIG. 2 illustrates basic features of a prior art binary cycle geothermal power plant.

The following descriptions, read in conjunction with the foregoing drawings, disclose inventions for a system, apparatus, and methods, for generating electricity for base through peak load conditions using renewable energy sources. The inventions provide renewable energy power plants that generate electricity without burning carbon-based fuels and without emitting harmful chemical compounds into the earth's atmosphere. Principle features of the inventions include:
1) A distributed heat balancing system for generating electric power using geothermal fluids and hydrogen as working media, in combination with wind or solar power generation and electrolysis;
2) Heat balancing apparatus using a closed, herringbone vane heat exchanger in a counterflow configuration that employs steam produced by a hydrogen-fired boiler to transfer its heat energy to and optimize the heat content of the working fluid or gas;
3) A hydrogen injection apparatus using rare earth magnetostrictive (REM) valve-controlled capillary tubes to enhance the energy content of the geothermal working fluids, directly regulate the density of the steam driving the turbine generators, and to boost the temperature of the working fluid being returned via the injection well to the strata providing the geothermal energy;
4) A cavitation phase separator apparatus and method for separating gas constituents and other materials not chemically bound from geothermal fluids; and
5) A computer control system and method for controlling the heat balancing, hydrogen injection, and other systems in a renewable energy power plant to optimize the operating efficiency of the generating system and to balance the electricity outputs in response to the demand for power.

Introduction

Geothermal energy refers to hot materials obtained from production wells drilled into hot strata in the Earth's crust. These hot and, in certain locations of the Earth's mantle, very plentiful materials may be steam (dry steam), water at a temperature above the boiling point (wet steam), or other fluids such as brines containing mixtures of water, salts, minerals, or gases. The geothermal fluids, brines, and gases are generally hot and under substantial pressure. The term "geopressured gas" refers to geothermal gas under pressure in confined spaces in the Earth's crust. The term "geothermal fluid" is a general term referring to any such geothermal material that is brought to the surface for the purpose of utilizing its heat energy in some useful way. The geothermal fluid has a temperature corresponding to the depth below the surface of the Earth at which its deposits exist. The average geothermal gradient is approximately 25° C. per Kilometer of depth. Thus, the range of depths of interest as sources for the geothermal fluids to be used in geothermal power plants is in the range of 4 to 8 Kilometers below the surface of the Earth, providing fluid temperatures of 100° C. to 200° C.

In the inventions to be described, hydrogen gas, derived from renewable sources such as wind power generators (or, as it is further developed, solar energy generators) is stored and then used in several ways. One use is as a fuel for hydrogen-fired boilers to produce hot, dry steam. Burning hydrogen to heat the boilers uses no carbon based fuels and thus may operate as a closed loop system. In such a system there are zero carbon emissions into the atmosphere and, in certain locations, zero emission of the Criteria Air Pollutants recognized in the Clean Air Act. Another use of hydrogen is for injection in controlled amounts and temperature into the working fluid to boost the heat energy content of the working fluids or to regulate the density of the steam or gas turbine working fluid. Regulating the density of the steam entering the turbine enables matching the turbine output to the load and heat content of the working fluid is yet another use.

Moreover, the conversion of wind or solar (or other renewables) energy to electricity may then be used to decompose water into its constituents hydrogen and oxygen in an electrolysis plant or electrolyzer, whereupon the separated gases may then be stored in tanks for later uses. Thus, hydrogen may be used as a storage media for electricity generated from renewable sources, a principle feature of the present invention. The stored hydrogen is very useful as a fuel for heating water in a boiler, for modifying the energy density of working fluids, for neutralizing the pH of substances recovered from the geothermal fluids, including the working fluids, or for neutralizing the pH of working fluids injected back into the earth. Further, the storage of hydrogen provides the capacity to respond to variations in both the demand for electricity and in the supplies of the renewable energy sources.

A further principle feature of the system is that the temperature of the working fluid input to the turbines is carefully balanced using specially constructed heat balancers that utilize heat from the boilers fueled by the stored hydrogen gas to supplement and regulate the heat content of the working fluid at the turbine inlets. The system also includes apparatus for separating various materials not chemically bound from the working fluids for reuse with a minimal expenditure of energy and zero emissions. Moreover, the system adjusts for variations in both generator loading and energy source outputs. For example, wind power electric generation is subject to wide variations in output due to climate conditions, time of day, etc. Conversion of the wind generated electricity to a storable form of energy (such as the stored hydrogen) that can be tapped on demand is provided by the present inventions as will be described.

The Uses of Hydrogen

Figure 3:
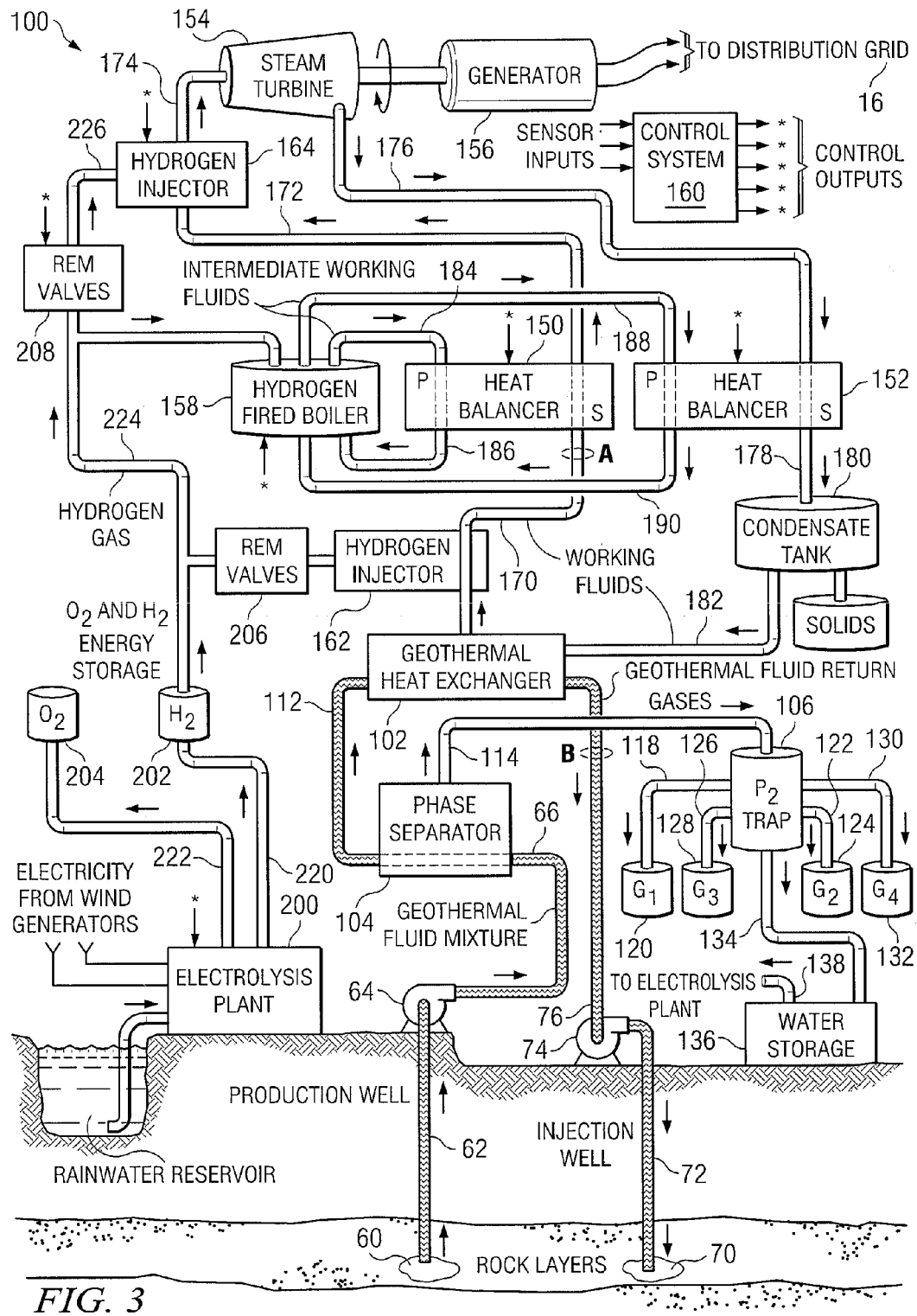
FIG. 3 illustrates one embodiment of a renewable energy power plant according to the principles of the present invention.

One source of hydrogen is to use the electric power generated by renewable wind-powered turbines as shown in FIG. 1 to generate electricity for use in an electrolysis process to produce hydrogen gas (See FIG. 3). The hydrogen thus produced may be readily stored for later use as needed. This provides a clean method of storing the energy derived from wind power for later use and for producing hydrogen gas for use in the geothermal turbine generator system. The oxygen produced in the electrolysis unit may also be stored for reuse or sold on the commercial market. The design of the geothermal turbine system may include compressing and burning the hydrogen gas output in a main turbine stack to produce electricity during peak demand. The waste heat recovered from the turbine operation may then be directed back to operate both the Rankine Cycle process and the initial geothermal system without requiring additional heat output from the hydrogen boiler. These uses of hydrogen thus make possible efficient increases of generating capacity in response to increased demand.

The primary use of hydrogen in the present novel system is as fuel for firing boilers to generate high temperature steam to feed through the heat exchanging structure in the heat balancers so that the temperatures of the working fluids driving the turbines may be regulated at peak efficiency. Hydrogen may also be injected into the source fluid inlet of a heat balancer to augment and regulate the heat content of the source fluid. Further, a relatively small amount of the hydrogen may also be used to regulate the density of the working fluid fed to the turbine inlets. The injection of hydrogen gas into the working fluid inlet to the turbines enables regulation—i.e., optimization—of the density of the working fluid to provide the most efficient operation of the turbine generator in response to variations in demand. That is, the torque output of the turbines can be closely controlled, by regulating the density of the driving fluid input to the turbine, to thereby regulate the electricity output of the generator.

The hydrogen may be provided by electrolysis in an electrolyzer or electrolysis plant powered by the wind power generators and stored for use by the hydrogen-fueled boilers that are used to produce the steam fed to the heat balancers, which provide the optimum temperature working fluid to the turbines. Thus, a zero emission, renewable source of energy is stored and utilized in these two methods of increasing the efficiency of the steam driven turbine generators. The system is operated by a control system under software control that responds to inputs from transducers located throughout the system that sense temperatures, pressures, load variations, etc. to regulate the operation of the heat balancing and hydrogen injection apparatus placed in the working fluid inlet paths to the steam driven turbines.

The apparatus for injecting hot hydrogen gas into the working fluid—the hydrogen injection unit—is preferably a cylindrical tube having at least two manifolds attached to diametrically opposite sides of the cylinder and disposed along the full length of the cylinder. As will be explained, the hydrogen injection apparatus may, for example, be used in two different locations or applications in the system of the present invention. In one application, the cylinder may be placed on the inlet side of a heat balancer. In another application, the cylinder conveys the regulated working fluid from the heat balancer to the inlet of the turbine. In each application, both manifolds contain a large number of micro-capillary tubes or passages that are distributed over the surface of the cylinder within the boundaries of the manifold. These micro-capillary tubes permit the entry of the hot hydrogen gas under pressure into the interior of the cylinder to mix with the working fluid, thus reducing its density according to preset parameters under the control of the control system.

The control of the amount of hot hydrogen admitted to the injection unit may be provided by rare earth magnetostrictive (REM) valves. REM valves operate similarly to piezoelectric devices, but respond to magnetic field variations used as control signals instead of electric field variations. As in the heat balancer to be described, the surfaces of the injection unit are preferably coated with a boron nitride or carbon nitride ceramic coating. The same basic injection unit design may be used elsewhere in the system, such as at the output of the cavitation separator (to be described) for the injection of selected gases to provide an operational enhancement. When used to control the hydrogen injection, the REM valves themselves may be cooled using thermoelectric coolers as also described below for the cavitation separator.

Hydrogen injection may be used for yet another purpose in the present invention: to adjust the pH of the working fluid. This has several benefits: (a) to facilitate cleaning because of the more neutral pH of the working fluids; and (b) to enable precipitation of certain minerals from the working fluids during electrolysis. Such metals and mineral bearing elements as copper, silver, uranium and other radioactive materials, chromium, vanadium, cobalt, phosphorus, sulfur, magnesium, potassium, sodium, and chlorine (to name a few) may thus be recovered for other uses.

The Renewable Energy Power Plant

Figure 4:
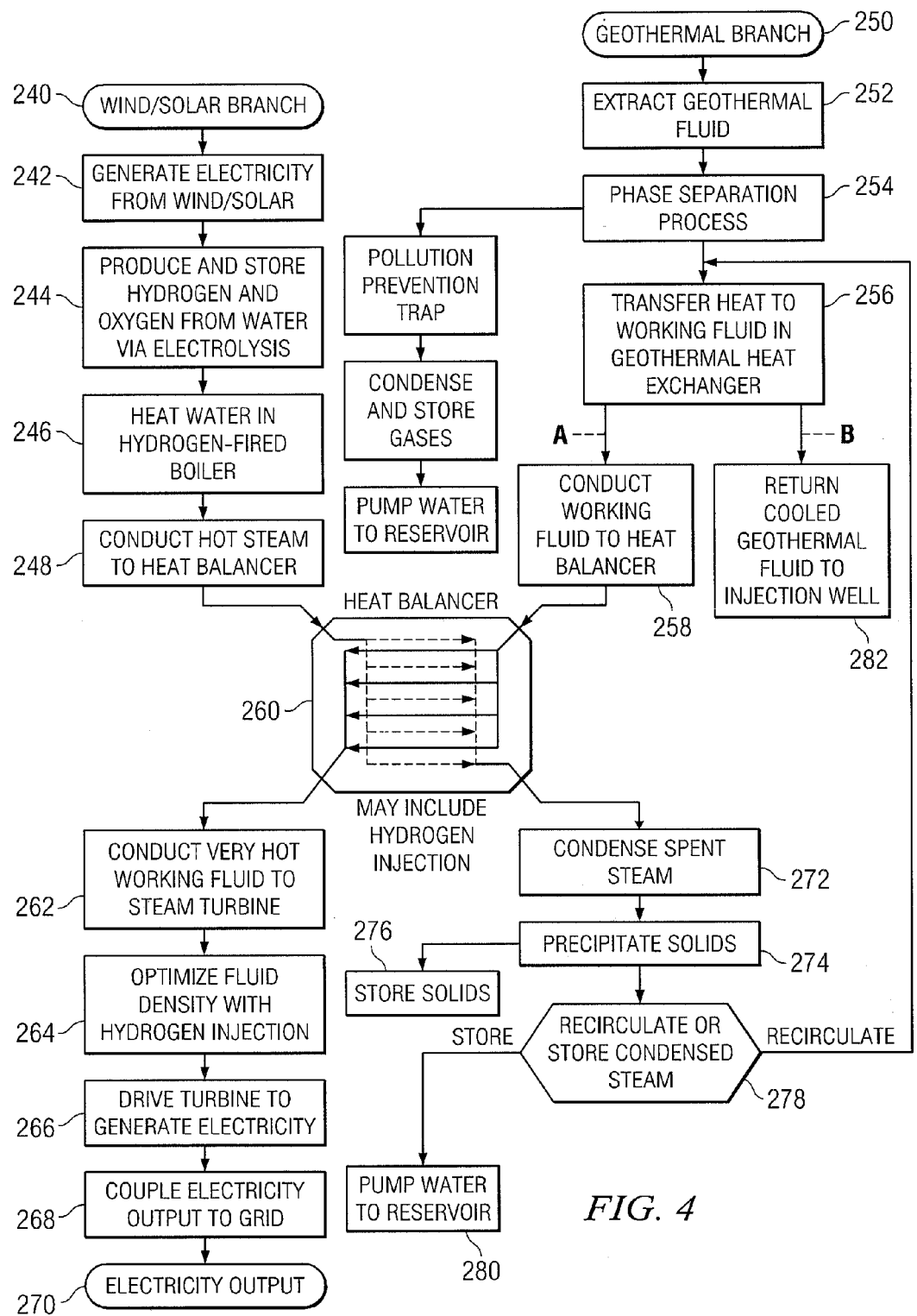
FIG. 4 illustrates a flow chart diagram of one aspect of the embodiment of FIG. 3.
Figure 5:
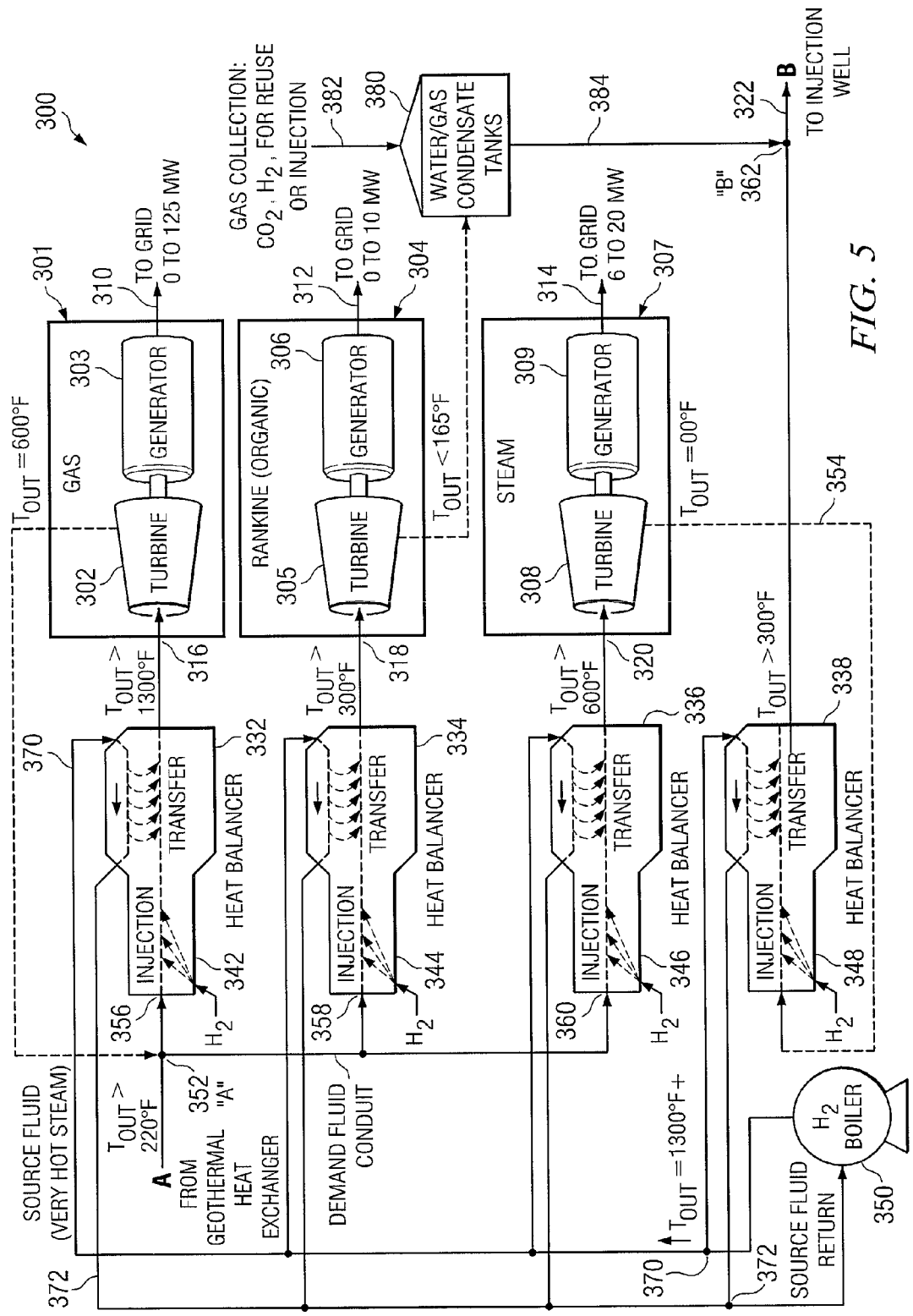
FIG. 5 illustrates a block diagram of another aspect of the embodiment of FIG. 3.

The renewable energy power plant according to the present invention will be described with the aid of FIGS. 3, 4, and 5. These figures are composed to demonstrate basic principles of the inventions and how they may be utilized. FIG. 3 illustrates a simplified renewable power plant system. FIGS. 4 and 5 illustrate certain aspects of the system directed to several exemplary embodiments. The boldface capital letters A and B that appear in FIGS. 3, 4, and 5 serve as reference points in common as will be described. Persons skilled in the art will recognize that many variations or combinations are possible by consideration of the alternatives shown in FIGS. 3, 4, and 5 when reviewed together. In the next few paragraphs, some general descriptive comments will be presented as an aid to understanding this relatively complex system, before the structural details are described.

A simplified drawing of a renewable energy power plant system (REPPS) according to the present invention is shown in FIG. 3. FIG. 3 illustrates one embodiment of a basic system to demonstrate how various elements or components may be used together to enhance efficiency and optimally balance available renewable energy resources to produce electricity that matches the demand for electricity at any particular time. As will be recognized by persons skilled in the electric generating system arts, many combinations of these components are possible, including combinations that require one of more of the structures shown in FIG. 3 in multiple places in the system. However, the embodiment illustrated in FIG. 3 includes the structural features needed to demonstrate the principles of the present invention, which utilizes renewable energy sources in a novel way that may be applied in a variety of ways without departing from the scope of the invention.

In general, the system illustrated utilizes geothermal energy and wind energy sources. Both sources are considered to be renewable, and are not subject in practical terms to depletion. Each renewable source is processed separately in respective branches. The respective outputs from a geothermal (first) branch and a wind energy (second) branch are merged in a heat balancing apparatus and process to provide hot, dry steam optimized to drive a steam turbine electric generator at maximum efficiency. Although FIG. 3 appears complex, it may be readily understood by recognizing that there are three basic circuits in the system.

The first basic circuit in FIG. 3, called the "primary source side," processes the geothermal fluid pumped from the hot rock strata deep in the Earth's mantle. This circuit is located in the lower center and right corner of the drawing and corresponds to the first (geothermal) branch. The second basic circuit, called the "demand side," contains the circuits and apparatus for processing the working fluid. The working fluid receives its initial heat energy from the geothermal fluid. The heat energy content of the working fluid is further boosted in the heat balancers to suitable levels for driving the turbines at maximum efficiency. The demand side is located in the upper half of the drawing and may be thought of as corresponding to the output section of the power plant. The third basic circuit, called the "secondary source side" in this description, is located along the left side of the drawing. The secondary source side contains the circuits and apparatus for producing and processing hydrogen gas that will be used in the system to enhance its efficiency. The secondary source side receives energy originating from wind power generation and thus corresponds to the second (wind energy) branch mentioned herein above.

In the first branch of the basic system of FIG. 3, the "primary source side" corresponding to the first basic circuit, geothermal fluid pumped from a production well deep into the Earth's mantle may be circulated through a phase separator (to be described) and input to a heat exchanger (the "geothermal heat exchanger") to transfer the heat content of the geothermal fluid to a working fluid. The heated working fluid may receive a metered amount of hydrogen as described above to optimize its energy content. Thus fortified, the heated working fluid is available to feed to an input of the demand side of the heat balancer. Upon exiting from the geothermal heat exchanger, the cooled geothermal fluid, having given up much of its heat energy to the working fluid, may be routed to an injection pump to return it to an injection well, less that portion of its heat energy that was transferred to the working fluid to drive the turbine.

In the second branch, the "secondary source side" corresponding to the third basic circuit, wind-generated electricity is routed to an electrolysis plant similar to the one illustrated in FIG. 3. The electrolysis plant utilizes the wind generated electricity to decompose water into its constituent elements, oxygen ($O_2$) and hydrogen ($H_2$). Each of these gases is then stored in tanks until needed for use in the system or transported for other uses. The tanks may be especially designed, above-ground storage tanks or, for large volumes of gas, underground abandoned salt caverns may be used. In the present system of FIG. 3, the hydrogen may be piped to a hydrogen-fired boiler to heat water for producing hot steam to be used in the "demand side" of the system. The steam is then available to feed to an input to the source side of a heat balancer as will be described in detail herein below.

In an alternate embodiment in regions where wind power generation is not available, but sufficient sunshine is available, the solar energy may be converted to hot water and/or steam. This embodiment, though not illustrated herein employs well-known technology such as an array of heliostats focused on a water or fluid-bearing pipe as a target. A general description of the use of heliostats, including a simplified system diagram (See FIG. 3 in the article), is contained in an article entitled *Concentrating Solar Power: Energy from Mirrors*, by L. Poole, DOE/GO-102001-1147, PS 128, March 2001, produced for the U.S. Department of Energy by the National Renewable Energy Laboratory, and incorporated herein by reference in its entirety. The article is available at www.nrel.gov/docs/fy01osti/28751.pdf. Thus, solar energy may be used to heat water or other suitable fluid to very high temperatures for use in a heat balancer. The steam thus produced may be used as a source fluid fed to the heat balancers. Solar heating may also be used to generate electricity for use by the electrolysis facility to produce the hydrogen needed for injection.

In the heat balancer, heat from the hot steam source is transferred to the working fluid flowing in the demand side, leading eventually to the inlet to a steam turbine that is coupled to and configured to drive an electric generator. The output of the heat balancer, the working fluid on the demand side, may be enhanced by the injection of a small amount of hydrogen gas as a means of controlling the torque output of the turbine in response to the electricity load ("demand") on the generator. The electricity generated by the turbine generator may typically be routed to a substation in a distribution grid or network (not shown). The hot steam source fluid, after passing through the turbine where much of its heat energy content was given up to the working fluid, may be routed to a condensing section of the system (condensate tank 180) to be stored or recirculated as working fluid. In some embodiments, as illustrated in FIG. 3, the spent steam working fluid may be passed through a heat balancer to replenish some of the lost heat energy before being routed to the geothermal heat exchanger.

Returning to the first, geothermal branch of the system shown in FIG. 3, routing the extracted geothermal fluid through a phase separator provides for extracting various potentially useful constituent elements from the geothermal fluid. There are at least two purposes for including this auxiliary capacity in the system. First, it removes constituents such as elements or compounds that are corrosive or abrasive that could be harmful to the components of the system. Removing these materials extends the time between plant shut down for maintenance, cleaning, etc. A second reason for extracting these materials is that many of them have commercial value, which justifies processes for separating and storing them for later uses. In the system illustrated in FIG. 3, a cavitation phase separator is used to separate gases and some vapors from the geothermal fluid. Precipitated solids may be routed to one storage area or to a solution mining section of the system. Similarly, fluid materials may be stored or routed to the solution mining section. Finally, gases released during the cavitation process may likewise be stored for later use or routed to the solution mining section. Some of the separated constituents may be waste materials or harmful to the atmosphere if released. Thus, separate processing in a pollution trap may be necessary to extracting and containing them within the system.

Continuing with FIG. 3, there is illustrated one embodiment of a renewable energy power plant 100 (alternately, "system 100") according to the principles of the present invention. The principle components of the first circuit, the "primary source side" of the system 100 are a geothermal heat exchanger 102, a phase separator 104, and a pollution prevention ("P2") trap 106.

The principle components of the second circuit, the "demand side" of the system 100 are first 150 and second 152 heat balancers, a steam driven turbine 154, an electric generator 156, a hydrogen-fired boiler 158, and a control system 160.

The principle components of the third circuit, the "secondary source side" of the system 100 are an electrolysis plant 200, storage tanks 202,204 for hydrogen and oxygen respectively, and first 162 and second 164 hydrogen injector units.

Referring to the first, or primary source side "circuit," geothermal fluid such as dry steam or brine from deposit 60 is pumped through well pipe 62 by pump 64 and through casing or conduit 66 to the inlet of the phase separator 104. Following removal of the gaseous materials from the geothermal fluid in the phase separator 104, the geothermal fluid continues from the output of the phase separator 104 through conduit 112 to the inlet of the geothermal heat exchanger 102. The geothermal heat exchanger 102 is structurally similar to the heat balancers 150, 152 that will be described herein below in conjunction with FIGS. 6, 7, and 8. The main difference between them is that the heat balancers 150, 152 include an integral hydrogen injection unit and may be scaled upward dimensionally to accommodate greater fluid volume and/or viscosity.

After giving up much of its heat energy in the geothermal heat exchanger 102, the cooler geothermal fluid continues as the "geothermal return" through conduit 76 to be pumped into an injection well 72 by a pump 74, where the fluid is returned to a return deposit 70. Gaseous materials are removed from the geothermal fluid by the phase separator 104, which, in the present invention operates according to a cavitation process, as will be described for FIGS. 9-13. Briefly, the cavitation process vigorously agitates or shakes the geothermal fluid such that the pressure of the gas that is mixed within the fluid is allowed to increase causing the gas to escape from the fluid and exit via a conduit 114 to a pollution prevention ("P2") trap 106. The pollution trap (P2) 106, as will be described for FIG. 14, provides cooling sufficient to condense the gaseous substances into their constituent liquid form and separation into separate vessels (G1) 120, (G2) 124, (G3) 128, and (G4) 132 via the respective coupling pipes 118, 122, 126, and 130. The use of four vessels, instead of some other number, is illustrative and not intended to be limiting; other numbers or even types of vessels or receptacles are contemplated. Water remaining in the P2 trap 106 may be drained via pipe 134 into a water storage tank 136. The water in tank 136 may be pumped to the electrolysis plant via the conduit 138 for recycling.

Turning now to the second, demand "circuit" of FIG. 3, the working fluid (which may be an organic substance) that absorbs heat from the geothermal fluid in the geothermal heat exchanger 102 flows in a closed loop beginning with conduit 170 that passes through a "demand side" of the first heat balancer 150, then flows via conduit 172 through a stand-alone hydrogen injector 164, thence through conduit 172 to the inlet of the steam turbine 154. Following expansion and a corresponding steep pressure drop, during which the heat energy performs work on the turbine blades, the working fluid, now of diminished enthalpy, flows through conduit 176 through the "demand" side of a second heat balancer 152 to replenish its heat energy payload prior to being piped through conduit 178 into a condensate tank 180. In condensate tank 180, the gaseous or vapor components of the working fluid are condensed for storage or reuse, and the cleansed and replenished working fluid passes through a conduit 182 into the demand side of heat balancer 152 to repeat the process.

In operation, the recirculation of the working fluid for the steam turbine 154 is continuous, with heat energy replenished by the heat balancers 150, 152. The heat energy for replenishing the working fluid is provided in the "source side" of the heat balancers 150, 152. Circulating in the source side of the heat balancers 150, 152 via the respective conduits 184, 188 (on the inlet side) and respective conduits 186, 190 (on the return side) are intermediate working fluids—hot steam produced by the hydrogen-fired boiler 158. The working fluid circulating in the demand side of the heat balancers 150, 152 may further be subject to modification in some systems by the respective stand alone hydrogen injectors 162 and 164 along conduits 170 and 172. Hydrogen injector 162 is provided to optimize the energy content of the working fluid by decreasing its energy density. The hydrogen injector 164 is provided to regulate the density of the steam inlet to the generator 156 by injecting a small amount of hydrogen directly into the steam path. Only small amounts of hydrogen are needed to have a pronounced effect on the density of the steam entering the turbine 154. Through controlling the steam density, the torque applied to the generator shaft may be optimally matched to the load requirements. In cases where it is desired to increase the density, oxygen (O2) may be injected into the steam entering the turbine. The hydrogen injectors 162, 164 may be controlled effectively by the use of rare earth magnetostrictive (REM) valves 206, 208 respectively. REM valves 206, 208 operate similarly to piezoelectric devices, but respond to magnetic field variations used as control signals instead of electric field variations.

Turning now to the third secondary source side "circuit," an electrolysis plant 200 may be operated by electricity generated by wind-driven turbines (See FIG. 1) and applied to the electrodes within the electrolysis plant 200. Since the basic structure and operation of an electrolysis system are well known, it will not be further described herein except to say that when suitable positive and negative electrodes, immersed in water that is obtained, for example, from a rainwater reservoir 198 as shown (or, alternately, water returned from the turbine cycles that has been cleaned), are connected to a source of direct current, the current causes dissociation of the hydrogen and oxygen atoms which are released into the atmosphere surrounding the electrodes, where the gas molecules may be collected for storage. In the system illustrated in FIG. 3, the hydrogen and oxygen are respectively drawn into storage tanks 202, 204 through conduits 220, 222. In the present system, the hydrogen stored in tank 202 may be piped via conduit 224 to the hydrogen injection units 206, 208 as controlled by the REM valves 206, 208 respectively. the hydrogen gas from the storage tank 202 may also be used as a fuel for operating the burner(s) (not shown in FIG. 3) to produce high temperature steam used to boost the temperature of the working (organic) fluid that is fed to the inlet of the steam turbine.

The Control System

One other feature of FIG. 3 illustrated therein is a control system 160 in the upper right hand corner of the drawing. The control system 160 may be implemented as a computer control system and method for controlling the heat balancing, hydrogen injection, and other systems in a renewable energy power plant to optimize the operating efficiency of the generating system and to balance the electricity outputs in response to the demand for power.

Operating these various elements in a coordinated and efficient manner requires the use of a feedback control system, preferably one that operates according to program instructions executed by a computer. In general, the control system consists of (a) an input network of sensors deployed in various parts of the system; (b) a control logic section such as a system of electronic feedback circuits or one or more programmed computers that receive and operate on the input signals from the sensors; and (c) an output network of valves, actuators, or other control devices operated by the control logic and deployed at various other parts of the system for adjusting operating parameters of the system in response to operating conditions measured by the sensors and program sequences executed by the computer(s). The sensors and control elements are typically transducers especially configured for a particular task. Remote terminal units (RTUs) and programmable logic controllers (PLCs) are typically located at various locations or nodes of the system to interface with the sensors and control elements under the control of a distributed control system (DCS) and/or a supervisory control and data acquisition (SCADA) system. A human-machine interface (HMI) may be coupled to the SCADA or the DCS to enable supervisory interaction with the system. All of these units and controllers are well known devices that operate according to known communication and operational protocols in the industries involved in electric power generation and distribution.

In the feedback control system of the present invention, for example, sensors coupled to RTUs or PLCs may be used to measure such parameters as the temperatures, pressures, flow rates, and densities of the working fluids and gases, particularly the density, temperature, and volume of the hydrogen gas at various points in the system. Control devices such as motors, actuators, and valves, under the control of other RTUs or PLCs, adjust the flow of the working fluids, or the mixing of fluids of different temperatures, to maintain the fluids at optimum temperatures. One example of a control element is a rare earth magnetostrictive (REM) valve that is used as explained above to adjust the amount of hydrogen injection into the working fluid of the steam turbines. The control logic section, such as may be incorporated in the DCS, which interconnects the RTUs and PLCs, contains and executes the operating programs for configuring the system at a desired output and for adjusting the operating parameters of the system in response to conditions of renewable energy supply (climate, geothermal parameters, etc.) and electricity demand (loading of the grid, time of day, etc.), while maintaining operating efficiencies within a prescribed range. This control mechanism is preferably performed in real time to maintain optimum efficiency. With appropriate pre-set limits, decisions can be made and the system ramped up or down as needed to adjust to changes in either the supply side or the demand side, or both. A SCADA system, which may be generally located in a central office building at each renewable energy power plant system, may be coupled to the DCS for acquiring and monitoring the data provided by the sensors, adjusting set points for control, and the like. The various units of the system are coupled together via communications links or networks. Major functional tasks of the control system include: (a) that it must be integrated into the power distribution grid; (b) coordinating power delivery with the load requirements including power factor, etc.; (c) tracking the various parameters and BTU values in real time throughout the system; (d) providing appropriate responsive control and adjustment to operating conditions; and the like.

Figure 15:
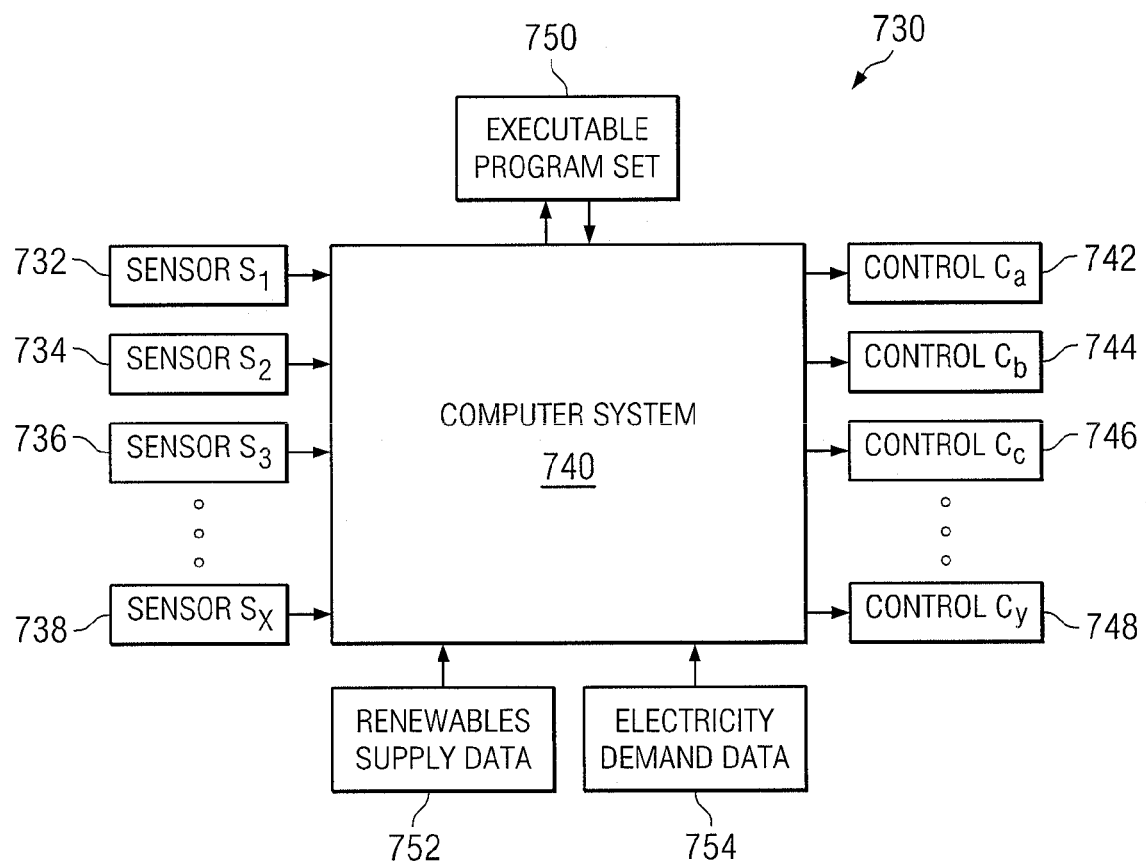
FIG. 15 illustrates a simplified block diagram of a programmable control system for use with the embodiment of FIG. 3.

Thus, in one embodiment of a renewable energy power plant the programmable control system 730 may include, as in the example shown in FIG. 15, a first network of input sensors $S_1, S_2, S_3, \ldots S_x$ (732, 734, 736, . . . 738) coupled to a programmable computing system 740 and disposed at first selected locations in the system for monitoring operating parameters; a second network of control devices Ca, Cb, Cc, . . . Cy (742, 744, 746, . . . 748) coupled to the computing system 740 and disposed at second selected locations in the system for controlling the operating parameters; an executable program set 750 providing instructions to the programmable computer system 740 coupled to the first and second networks to receive input signals from the first network and to send commands to the second network for executing control actions in the second network in real time according to (a) the executable program set 750, (b) status data regarding the supply of renewable energy 752 and the demand for electricity 754, and (c) a range of user preset operating points for maintaining an operating balance that optimizes efficiency.

Continuing with FIG. 15, the first network includes the sensors 732 . . . 738 and the programmable computing system 740. The second network includes the control devices 742 . . . 748 and the programmable computing system 740. The coupling of the sensors and control devices to the programmable computing system may be via any suitable communications link including wired, wireless, optical fiber, conveying base band or modulated data, etc. The programmable computing system 740 may include a server system and/or a network of PLCs. The executable program set 750 may include an operating system, a portfolio of application programs, and a plurality of PLC function charts or ladder diagrams configured for controlling and operating a renewable energy power plant. The programmable computing system 740 may include various user interfaces for monitoring and control, entering presets, running diagnostic programs, and the like. The implementation of a specific design for a specific system is readily within the level of skill in the art and need not be elaborated further herein.

Referring to FIG. 4, there is illustrated a flow chart diagram of one aspect of the embodiment of FIG. 3. FIG. 4 illustrates the aspect of the renewable energy power plant according to the present invention that emphasizes the merging of two renewable energy processes represented by two different energy input branches. The two energy input branches include a wind/solar energy branch and a geothermal branch. Energy from these two branches is processed and merged in a heat balancer apparatus, which may include an integral hydrogen injection unit. The heat balancer provides high temperature working fluid, of a density optimized for the loading present on the distribution grid, to drive the steam turbine generators at maximum system efficiency to produce the desired electricity output. In the wind/solar branch, corresponding to step 240, the process begins with the generation of electricity by operation of wind generators (See FIG. 1) or, alternatively, through the use of such well-known solar powered converters as a heliostat array for heating water or other fluids to high temperature steam for driving a turbine generator, a bank of photovoltaic converters for generating electricity, etc., in step 242. The electricity thus produced is conducted to an electrolysis plant to produce hydrogen and oxygen for storage in separate tank facilities, in step 244. In this way, the electricity produced from the renewable but variable wind (or solar) generators may be stored in the form of hydrogen or oxygen gas for later use. Such storage enables normalizing the wind-generated output (or the solar-generated electricity) to more uniform, predictable levels. Such storage of hydrogen further enables the availability of a carbon-free fuel for providing heat, in the form of high temperature (hot) steam, for providing the energy to ultimately drive turbines coupled to electric generators. For example, in step 246, hydrogen-fired boilers (158 in FIG. 3) may be used to heat water, converting it to the high temperature steam, which may then be conducted to the heat balancer (process step 260 in FIG. 4) in step 248. Thus, the wind (or solar) energy branch 240 provides the source fluid—and the high temperature steam—to boost the temperature of the working fluid on the demand side of the system, which drives the turbine generators 156. The use of hydrogen as a fuel obviates the need for pollution controls or other measures to limit the release of combustion by-products from carbon-based fuels into the environment.

Considering now the second branch of the system, in the geothermal branch 250, the process begins with the extraction of geothermal fluid from beneath the surface of the Earth in step 252. Upon extraction from the production well 62 by pump 64 (See FIG. 3) the geothermal fluid is routed through a phase separator 104 to undergo a phase separation process in step 254. Step 254 separates gases from the geothermal fluid before transferring the heat energy in the geothermal fluid to the working fluid in step 256 in the geothermal heat exchanger 102. The working fluid, with its elevated heat content, is then conducted in step 258 to a source side inlet of a heat balancer 150 at block 260. In the heat balancer 150, in the process that takes place in block 260, the working fluid absorbs additional heat from the hot steam produced in the hydrogen-fired boiler 158 during the steps 246 and 248 described herein above.

Returning to step 256, the geothermal fluid, after yielding its heat to the demand side working fluid in the geothermal heat exchanger, in step 280 is circulated through conduit 114 to be pumped into an injection well. It should be noted that both process paths that follow step 256 are identified with the boldface capital letters A and B. These letters identify reference points that are also shown in FIG. 3, which are the conduit 170 leading to a heat balancer input (Ref. A) and the conduit 114 leading to the injection well 72 (Ref. B). These reference points are so identified because they are convenient power plant expansion busses—common points in the energy-bearing conduits where additional structural sections may be added, essentially in parallel, to expand the capacity of the power plant to meet varying demands for electricity, from base load levels to peak load levels. An example of this expansion in capacity is illustrated in FIG. 5, which shows how multiple generators may be combined to provide increased capacity. The reference points A and B shown in FIG. 5 show the location of the connection points for the additional generator branches, using the same basic plant architecture described for FIG. 3 and the process diagram of FIG. 4.

As described herein above, the process performed in step 260 in the specially configured heat balancer 150 causes the working fluid, which is typically pre-heated in the geothermal heat exchanger 102, to absorb considerable additional heat energy from a source side input of very hot steam produced by the hydrogen-fired boiler 158. The temperatures and the amount of heat added, as well as a number of other parameters to be described, are regulated quantities controlled by the control system 160. The process step 260 may also include the injection of hydrogen gas into the source side fluid to optimize its density and heat energy level for the generating load presented to the renewable energy power plant step 256. From the heat balancing process 260 the working fluid is conducted to the input of the turbine 154 in step 262. The working fluid may further receive a small amount of hydrogen gas injection in step 264 to trim the density of the steam fed into the turbine in order to match the torque produced by the turbine 154 to the electricity demand upon the generator 156. In step 266, the steam drives the turbine, which is coupled to the electric generator 156. The output of the generator 156 is coupled to the electric grid in step 268, thus providing the electricity output 270 to meet the demand therefore.

Continuing with FIG. 4, and returning to process step 260, the hot steam residue, after passing through the sources side of the heat balancer 150, is directed to a condensation step 282. The flow then advances to step 284 to precipitate solid matter from the condensed solution if such a step is needed. Solid matter thus separated out of solution may then be stored in step 286 for later processing or reuse. After the precipitation step, a decision step 288 is performed to determine whether the solution—i.e., condensed steam—is to be recirculated or pumped to a reservoir or storage area. If the condensed steam is to be recirculated, the process returns to the entry to step 256. However, if the decision is to store the condensed steam, the flow advances to step 290 to pump the water to a reservoir for storage. It will be noted that the processes of FIG. 4 operate continuously as long as the power plant is operating.

Referring to FIG. 5, there is shown a block diagram of another aspect of the embodiment of FIG. 3. FIG. 5 illustrates a portion 300 of a renewable power plant architecture, which includes multiple heat balancer and turbine-generator combinations. In FIG. 5, as well as in FIGS. 3 and 4, the connection points for the additional heat balancer/generator combinations, identified by the capital letters A and B, are shown to enable cross referencing the three figures. Point A represents a steam bus 370 for conveying high temperature steam from the hydrogen boiler 350 (similar to the hydrogen-fired boiler 158 in FIG. 3) to the respective inputs to the heat balancers 332, 334, 336, and 338. The input to each heat balancer includes a hydrogen injection section, respectively 342, 344, 346, and 348. The high temperature steam is admitted to the respective inputs to the hydrogen injection units input, respectively 356, 358, 360, and 354. The steam exiting from the heat transfer sections of the heat balancers is conveyed to a return bus 372 for return to the hydrogen (H2) boiler 350 to be reheated.

Continuing with FIG. 5, the outputs of the heat balancers 332, 334, and 336 are coupled to the inlets 316, 318, and 320 of the turbine generators 301, 304, and 307. The respective turbines 302, 305, and 308 in each turbine generator drive a corresponding electric generator 303, 306, and 309 to produce electricity to be delivered to a distribution grid at respective outputs 310, 312, and 314. The turbine generator combinations may be sized to accommodate varying electricity loads. For example, the turbine generator combinations 301, 304, and 307 may be sized to produce, respectively, outputs of 0 to 125 MegaWatts (MW), 0 to 10 MegaWatts (MW), and 6 to 20 MegaWatts (MW). Through system control, the outputs may be adjusted to match the electricity supply to the load conditions, ranging from base load to peak load.

The steam that exhausts from the turbines, which has a much lower energy content, may be directed to other system locations as follows. In one example, the exhaust from turbine 302 may be conducted back to point A (352) to mix with the working fluid input to the input 356 of the hydrogen injection section of the heat balancer 332 for reuse in the same turbine generator 301. The heat lost in the turbine 302 is replaced during this recycling process by heat transferred from the hot steam produced by the hydrogen-fired boiler 350. In a second example, the exhaust steam from turbine 305 may be conducted to a water/gas condensate tank 380. From the tank 380, the condensed fluid may be conducted through conduit 384 to be mixed with other exhausted working fluids at point B (362) and injected along conduit 322 into the Earth at an injection well 72 (See FIG. 3). Another use for a water/gas condensate tank 380 is to collect such gases as $CO_2$, $H_2$, $H_2S$, and other byproducts produced in the power plant and condensed for re-use. In a third example, the exhaust from the turbine 308 is shown coupled to the input 354 of a fourth heat balancer 338 that is provided for processing such waste steam by increasing its heat energy to correspond with the heat energy content of the geothermal fluid obtained from the production well. Such processing enables replenishing the geothermal resource when it is not needed for the operation of the power plant. It is an example of the closed loop architecture of the present invention that minimizes the release of waste materials into the atmosphere. These examples are intended to be illustrative of some of the possibilities in a renewable energy power plant as described herein and not limiting.

The Heat Balancer

In the present invention, a heat balancer, placed at selected positions preceding the working fluid inputs to the turbines, is used to add heat energy to the working fluid as needed and to regulate the temperature of the working fluid. The heat balancer transfers heat from high temperature steam provided by hydrogen-fired boilers to the geothermal fluid from the production wells. This enables the system to augment and regulate the heat content of the geothermal fluid to compensate for natural variations, thus realizing a substantial boost in the operating efficiency of the turbines. Another component of the heat balancers provides for injection of hydrogen or other combustible gas into the geothermal fluid entering the heat balancer to supplement the energy density of the geothermal fluid. As will be described herein below, in another application of the injection function, combustible gases superheated by hydrogen may be injected in small amounts into the thermally enhanced working fluid just prior to the inlet of the turbine. Increasing the energy density in this way at this location enables regulation of the torque produced by the turbine, thereby controlling the electrical output of the generator driven by the turbine.

The heat balancer includes a specially constructed, counterflow-type heat transfer mechanism that operates in a feedback control loop to regulate its operation using the control system to be described. The heat balancer to be described includes several additional features not found in a conventional heat exchanger. In a typical heat exchanger, one common function is to dissipate excess heat from a working fluid flowing in a closed circuit to a cooler external environment such as the air or a large body of water. In such heat exchangers the flow of the single fluid often proceeds along a loopback path. In some heat exchangers of higher efficiency employing a flat plate, counterflow construction, which transfer heat from one fluid to another, the flow of the hotter fluid and the flow of the less hot fluid are in opposite directions relative to each other, i.e., in "counterflow." Some embodiments of the flat plate heat exchanger construction may include embossed patterns in the plates.

Several aspects of the heat balancer to be described employ a combination of features that differentiate it from ordinary prior art heat exchangers. First, the heat balancer described herein adds heat from one fluid flowing in a closed circuit (hotter side) to a working fluid flowing in another circuit (cooler side), which is enclosed within the heat balancer. Second, the flow of both the source and demand side fluids in the heat balancer described herein is direct, that is, in one direction from its inlet port to its outlet port. Third, in the heat balancer of the present invention the source side and the demand side passages are separated by flat plates such that the source side and demand side passages alternate because of the interleaved internal structure of the passages in the heat balancer. Fourth, each of the plates includes a particular herringbone pattern formed into the plates to increase their surface area and promote a predetermined amount of turbulence. Fifth, the heat balancer described herein includes a device for injecting a supplementary compound or element, such as hydrogen gas or other substance into the inlet or outlet of either side (source or demand) of the heat balancer. Preferably, in the embodiments described herein, the heat balancer includes an injection unit installed in the demand side inlet to inject, for example, a combustible gas such as hydrogen to modify the energy content or density of the demand or working fluid. Sixth, the internal surfaces of the heat balancer in contact with the fluids may be coated with very hard, corrosion-resistant materials such as born nitride (BN) or carbon nitride ($C_3N_4$).

In the heat balancer described herein, the heat transfer mechanism includes a source fluid (hotter) side and a demand fluid (less hot) side. The source fluid side admits the high temperature steam that is obtained in this example from a hydrogen boiler. The demand fluid side admits the lower temperature working fluid from the geothermal production well that is routed to an inlet to the turbine after its heat energy is increased. These two sides are separated in the heat transfer section of the heat balancer by an enclosed structure formed of an array of thin, substantially flat, parallel plates having herringbone-pattern surfaces for maximum surface area and heat transfer. The source and demand fluid passages are interleaved and may be enclosed in a box-like housing. The housing may be configured in other forms, such as cylindrical or other shape that facilitates the flow of fluids within it. Thus, a first (source) working fluid circulates through one set of passages between alternate pairs of plates, while the second (demand) working fluid circulates through another set of passages disposed—i.e., interleaved—between the remaining pairs of plates. The flow of the two working fluids is in opposite directions on either side of each plate, that is, in counterflow with each other, in order to obtain maximum heat transfer from one fluid to the other. The thin plates may be fabricated of stainless steel, vanadium steel, molybdenum steel, and the like. A herringbone pattern may be formed into the plates to enhance the transfer of heat without impeding the flow along the surfaces of the plates. The herringbone surfaces are coated with a material impervious to corrosive effects or chemical attack from the working fluid and possess a very high heat transfer rates. Suitable materials for this coating include ceramic nitrides of boron, carbon, etc.

In operation, very high temperature steam produced in a hydrogen-fueled boiler is pumped through a source side inlet to the heat balancer. The working fluid enters a demand side inlet of the heat balancer and flows through it to absorb heat energy transferred from the hot steam flowing in the source side, then exits from an outlet manifold toward the inlet to the turbine with its elevated heat content. The two working fluids do not mix because their respective sets of interleaved passages are separated by the flat plate structure. The temperature of the thermally enhanced working fluid may be controlled within a one degree tolerance to match the optimum operating temperature of the turbine. The working fluid, after circulating through the turbine, exits toward a condensate tank to be available and balanced for reuse.

Heat balancers may also be located at the production wellhead to regulate the temperature of the geothermal fluids from the production well. A third location for a heat balancer is at the exit point of the system, to regulate the temperature of the geothermal fluid returned to the rock strata beneath the earth's surface. This combination of components enables not only high efficiency electricity generation from renewable sources but it also operates as both a base load system and a peak load system, depending on the demand for electricity.

Additionally, the geothermal system of the present invention is well-suited as a back-up power source for wind power generation that is experiencing low output due to reductions in the prevailing winds that occur from time to time. This is in contrast to conventional geothermal systems, which are capable of operating as base load systems only. Moreover, the flow of heat to the heat balancers makes this system's flow diagram completely reversible to allow heat flow input as well as control of hydrogen injection points such that the system becomes a stand alone power plant for generating electric power. The heat balancers may also use a variety of heat sources including direct application of solar heating to a heat balancer, or solar thermal fluids may be used in conjunction with hydrogen generated from wind or solar generated electricity.

In one example of a stand-alone power plant, the system of FIG. 3 minus the components connected to the inlet side of the geothermal heat exchanger 102, which include the geothermal fluid, the cavitation phase separator, and pollution prevention trap, etc., may be used as an adjunct to a wind power generation facility that lacks access to geothermal fluids of a suitable temperature. Thus, the hydrogen-based generation capability may be used to optimally supplement the wind power output.

Figure 6:
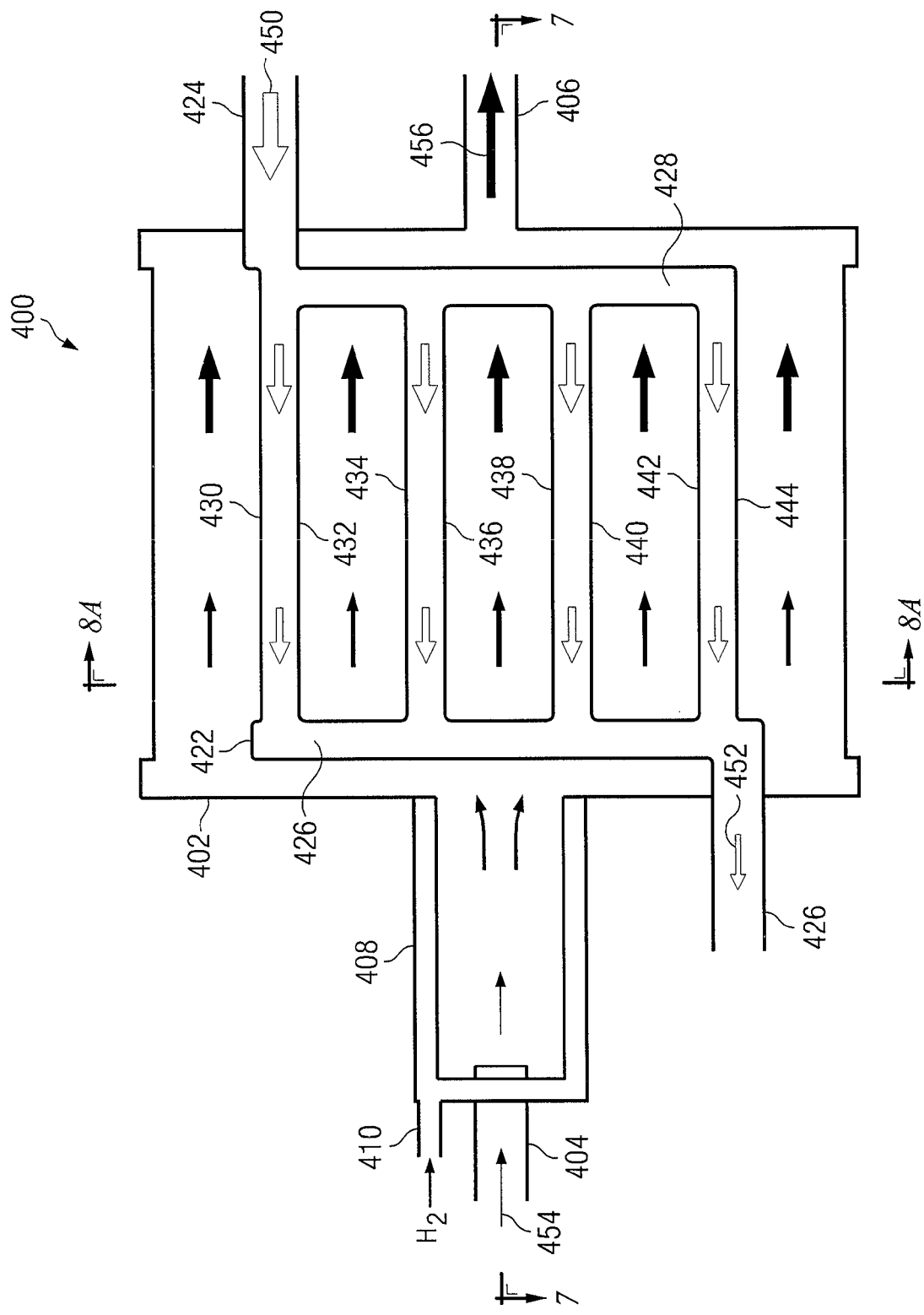
FIG. 6 illustrates atop side view of a heat balancer apparatus of the embodiment of FIG. 3 having a hydrogen injection manifold coupled thereto and showing paths of flow of geothermal fluids (source circuit) and working fluid (demand circuit) through the heat balancer.

Referring to FIG. 6, there is illustrated a simplified plan view (from above) of a heat balancer apparatus of the embodiment of FIG. 3 including a hydrogen injection manifold coupled thereto. This figure is simplified to illustrate the concepts embodied in the heat balancer. FIG. 6 shows the paths of flow of geothermal working fluid (demand circuit) indicated by the solid arrows, and the high-temperature (source circuit) fluid indicated by the open-bodied arrows through the heat balancer. In this example of the structure of a heat balancer, it should be noticed that the source side fluid flow (open arrows) is constrained within a closed set or bank of parallel passages as viewed from above, wherein the spacing between the source fluid passage sides is uniformly maintained at one unit value, indicated by the lower case letter m. Further, each pair of source side passages is spaced approximately three unit values apart in this example, as indicated by the lower case letter k. The entire bank of source side passages is then seen to be nested within an enclosure dimensioned to provide the narrower source side passages interleaved among the wider demand side passages. Thus, the width k of the demand side passages is approximately three times the width m of the source side passages. The unit value, m, in this example may be approximately one inch or 25.4 mm. The value k, in this example, may be approximately three inches or 76.2 mm. The actual values will depend on the application.

Stated another way, the ratio of k/m=3. This is an intentional design feature that provides an efficient balance of the flow volumes of the source and demand fluids as well as allow for the greater proportion of solids suspended in solution that is likely with the demand side (geothermal) fluids. The structure illustrated in FIG. 6 also shows that the manifolds for the conveying of the fluids into and out of the heat balancer are simple flow passages, being integrated into the design of the heat balancer. For example, the manifolds 427, 428 for the source fluid passages are shown joining the ends of the passages containing the open arrows, and the manifolds for the demand fluid passages are provided by the relationship of the outer shell (or first enclosure) 402 and the source fluid bank 422 illustrated in FIG. 6. In one embodiment of the manifolds 427, 428, the surface of the manifolds 427, 428 in contact with the demand side (geothermal) fluid—i.e., the "external" surface—may preferably be configured with fins to enlarge their surface area and thus increase the transfer of heat from the source side fluid (hot, dry steam) into the demand side fluid. The flow of the respective fluids is indicated by the arrows, with the relative temperature of the fluid at each arrow location indicated by the width of the arrow shaft. A narrow arrow indicates a lower temperature and a wider arrow indicates a higher temperature. Thus, the demand side fluid gains heat and the source side fluid loses heat as the respective fluids traverse the heat balancer and the transfer of heat takes place from the source side (open arrows) to the demand side (solid arrows). The demand side fluid may also be thought of as the fluid that flows in the load side of the power plant.

Continuing with FIG. 6, a heat balancer 400 is formed by a rectangular outer shell 402 (or first enclosure 402) enclosing a space there within. The enclosed space within the shell 402 provides for the flow of the demand side fluid between an inlet 404 at a relatively low temperature 454 and an outlet 406 at a relatively higher temperature 456. The flow follows the solid arrows through the passages having a uniform spacing "k" and exits at an increased temperature 456 at the outlet 406 after absorbing heat energy from the source fluid. Disposed between the inlet 404 and the shell 402 is a second enclosure 408. The second enclosure 408 provides a chamber for injecting a combustible gas such as hydrogen or other substance via an injection port 410 into the incoming stream of the demand fluid, which will be described in detail for FIG. 7.

Continuing with FIG. 6, centered within the first enclosure 402 is a structure for containing and conveying the flow of source fluid through the heat balancer 400. This structure, briefly described herein above is called in this description a source fluid bank 422. The source fluid bank includes an inlet 424 and an outlet 426. Source fluid at a relatively high temperature 450 enters at the inlet 424, passes through the set of passages within the pairs of plates 430/432, 434/436, 438/440, and 442/444 in this illustrative example. The flow follows the open arrows through the passages having a uniform spacing dimension "m" and exits at a reduced temperature 452 at the outlet 426 after transferring most of its heat energy to the demand fluid flowing in the space within the first enclosure 402. A careful review of FIGS. 6 and 7 reveals that, while the shell 402 forms a housing for the heat balancer 400, the combination of the shell 402 and the flat, parallel plates 430 to 444 of the closed source fluid bank 422 that is enclosed within the shell 402 provides all of the structure necessary to direct the respective flows of the source side and demand side fluids in separate, interleaved passages and in opposite (counterflow) directions through the heat balancer 400.

Figure 7:
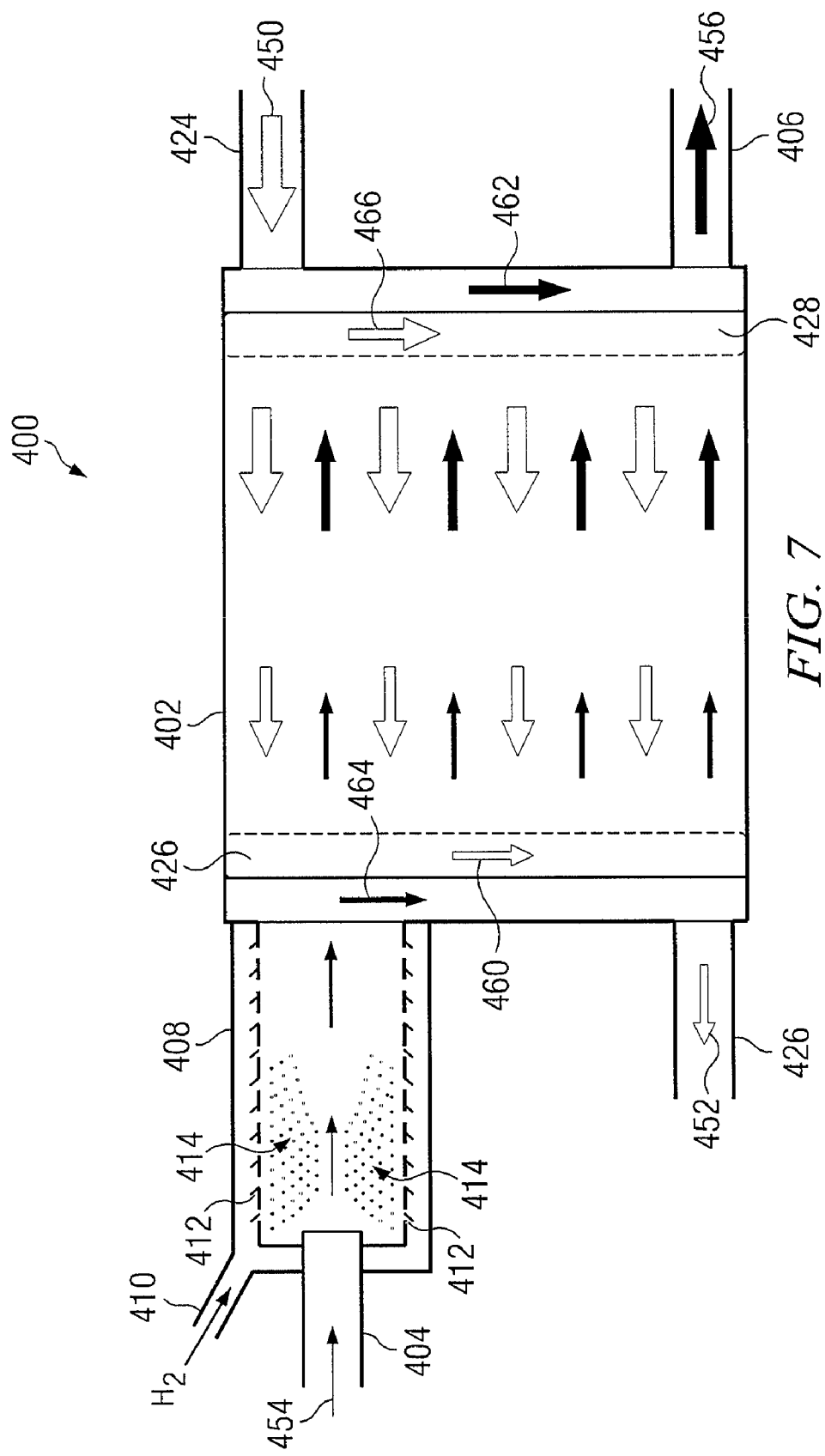
FIG. 7 illustrates a side elevation view of the heat balancer apparatus of FIG. 6.

Referring to FIG. 7, there is illustrated a side elevation view of the heat balancer apparatus of FIG. 6. Like FIG. 6, this figure is also simplified to illustrate the concepts embodied in the heat balancer. The open arrows flowing to the left represent the flow of the source side fluid behind the plate 436. The solid arrows indicating the demand side fluid are shown on the near side of a plate 436 of the source side bank (e.g., flowing to the right, in front of plate 436 in FIG. 6). It should be apparent that, were this figure illustrating a heat balancer 400 in actual operation, the demand fluid indicated by the solid arrows would be a unitary sheet of fluid extending from the top to the bottom of the heat balancer and flowing to the right in the figure in front of the plate 436. The demand side fluid 454 of low temperature is shown entering the inlet 402, passing through the injection chamber 408, thence into the demand side of the heat balancer at 464. Upon passing through the heat balancer, the demand side fluid flows at 462 toward the outlet 406 and exits at a high temperature 456. Similarly, the source fluid enters inlet 424 at a high temperature 450, then enters the source side of the heat balancer at 466. The open arrows flowing to the left represent the flow of the source side fluid behind the plate 436. Upon passing through the heat balancer, the source side fluid flows at 460 toward the outlet 426 and exits at a lower temperature 452.

Continuing with FIG. 7, the description of the gas injection manifold or chamber 408 will be provided. The gas injection chamber 408 includes space for the demand fluid 454 to enter the inlet port 404. The injection chamber 408, which functions as a manifold for mixing an additive substance such as a combustible gas into an incoming fluid, is shown as a double-walled structure having an outer shell 410 and an inner shell 412. A feed port 414 enables hydrogen or another injection substance such as oxygen, for example, to enter the space between the outer 410 and inner 412 shells of the injection chamber 408 and mixed with the incoming fluid. The inner shell 412 is equipped with a large number of orifices 416 that surround the enclosed space within the injection chamber 408. In a preferred embodiment, the orifices 416 are provided by microcapillaries for causing the hydrogen or other gas or injected substance to diffuse into the injection chamber 408 as a very fine cloud 418 of individual gas bubbles. The incoming demand fluid then absorbs—i.e., is mixed with—the bubbles of gas in a substantially uniform manner to provide the desired energy density.

The injection chamber 408 may alternatively be used as a stand-alone device or manifold positioned in-line in any conduit, pipe, or passage in which a fluid material bearing heat energy is flowing. Such an injection chamber 408, equipped with an outlet port (not shown in FIG. 7, but it would resemble the inlet port 404), enables injection of a gas into the fluid to enhance or regulate its heat content, energy density, or provide an additive substance to promote cleaning of the interior walls of the conduits, etc. An example of an injection chamber 408 used as a hydrogen injector is shown in FIG. 3, at reference numbers 162 and 164.

Referring to FIG. 8A, there is illustrated a simplified diagram of the cross section of the heat balancer of FIGS. 6 and 7. In this view, which corresponds to the flow of source fluid toward the viewer, i.e., away from the page, the narrower spacing m identifies the passage between the plates 430 and 432, which join the housing 402 at the ends of the plates 430 and 432. The passage thus formed is wide (tall in this view) and narrow (laterally in this view). The other spacings respectively between 434 and 436; 438 and 440; and, 442 and 444 similarly represent the same feature of the source fluid passages within the heat balancer 400, whereby the passages are formed primarily by wide, flat plates. It will also be noted that the spacing k represent the separation of the pairs of wide, flat plates that form the source fluid passages.

Referring to FIG. 8B, there is illustrated a cross section view of a portion of one of the plates 430 of the heat balancer 400 of FIGS. 6 and 7 that separate the source side and the demand side fluid flows. The edge-wise view in FIG. 6 of the plates that form the large planar side of the passages for the source and demand side fluids in the heat balancer 400 indicate that the plates are flat planes. FIG. 8, however, by expanding (magnifying) the scale shows that the edge-wise view of each of the plates 430, 432, 434 . . . 444, indicates that the cross section of the plates is a regular zig-zag or herringbone pattern having an included angle of approximately 126 degrees and a peak-to-trough height of approximately d=4 mm. This configuration of the plates provides a consistent surface topography that has properties that affect the flow of fluid and provide an impediment to scaling. Scaling is the accumulation of deposits of substances such as calcium carbonate ($CaCO_3$) or gypsum ($CaSO_4$-$2H_2O$) from the geothermal fluids. In this example, the plates may be formed of ⅛ inch (3.2 mm) thick steel such as austenitic steel—654 SMO and coated with a layer of boron nitride (BN) or carbon nitride ($C_3N_4$) to a thickness of 0.002 to 0.004 inch (0.05 to 0.10 mm) to resist corrosion and enhance heat transfer. Both of these coating materials are characterized by excellent thermal conductivity and very high hardness. The zig-zag form of the plates is a simple way to increase the surface area of the plates, thereby increasing their ability to transfer heat from the hotter fluid to the colder one. In this example, given the angle and dimension in the previous sentence, the improvement by simple trigonometry is approximately 12%. Further, the plates may be oriented such that the direction of the zig-zag either runs the same direction or across the direction of the fluid flow. Flow with the zig-zag tends to channel the flow of the fluids, increasing the flow rate; flow across the zig-zag produces more turbulence, and potentially greater heat transfer but at the risk of increased deposits from fluid-borne impurities, called scaling, that remain in the fluid following phase separation.

The Cavitation Phase Separator

The process of phase separation is well known in the oil and gas field as well as in the chemical industries, laboratories, etc. Phase separation, referring to the separation of mixtures of the chemical elements found in nature into the three fundamental phases—solid, liquid, and gas, may be accomplished by a variety of processes. These include, for example, distillation, condensation, filtration, precipitation, electrolysis, and the like, which may be enhanced through the use of catalysts, the application of heating or cooling, or various other mechanical or electrical processes, etc.

The renewable power plant system of the present invention illustrated in FIG. 3 includes a novel cavitation phase separator (CPS) for purifying the geothermal fluid prior to its use as a working fluid for driving the steam turbines that provide the motive force for the generators. This geothermal fluid, in addition to dry steam may include brine, gases, oil, solids in suspension, a variety of metals, minerals, etc. Cavitation is selected as a mechanism to provide the phase separation because of the efficiency inherent in resonant devices, and in the relative ease and economy with which it may be implemented. In the process, the geothermal fluid is fed into a container where it is subject to vigorous shaking forces produced by the walls of the container. The shaking forces are sufficiently vigorous to induce cavitation in the fluid mixture, causing it to release low pressure gases and or vapors from the liquid mixture that are not chemically bound together. The gases and vapors thus removed from the geothermal fluid may be gathered in storage tanks for further processing or commercial sale to recover the economic value. Solid materials may be precipitated out of solution, and the water vapor that is too cool for use as a geothermal fluid may be condensed for storage or reuse.

The CPS is thus very useful as part of a system for efficiently separating out the constituent substances that are not needed for driving the steam turbines. A CPS may also be used elsewhere in the system for purifying spent working fluids prior to reuse in the system or replenishing the subsurface strata from which the geothermal fluid was originally pumped. The cavitation phase separator described herein produces cavitation in the fluid material by agitating it using sound waves generated by piezoelectric transducers. Cavitation occurs when the pressure of a fluid in motion drops below its vapor pressure. The cavitation action vaporizes the fluid material such that the water vapor and gases boil off, are extracted, and transferred into storage tanks for later use.

Two types of cavitation phase separators are described herein for use in the system, both of which may be embodied in generally cylindrical tubes. In one illustrative embodiment, the cylindrical body or tube may be about 2½ feet long and one foot in diameter, providing a resonant cavity within it. The geothermal fluids are pumped through pipes or flex tubes attached to and aligned longitudinally along the outside surface of the cylindrical resonating chamber, en route to the heat balancers. These tubes are arrayed in contact with the outside of the cylindrical body, surrounding the cylinder with their longitudinal axes parallel to the axis of the resonating chamber. Contained within the cylinder is one of two configurations of a piezoelectric transducer. As is well known in the art, a piezoelectric material cut to a predetermined shape and dimension will expand and contract vigorously along one or more of its dimensions or axes at its inherent resonant frequency when excited by an alternating voltage of that resonant frequency. The amplitude of the vibration or displacement of the crystal is generally proportional to the amplitude of the applied voltage. In one mode, called "3-1," the axis of vibration is generally perpendicular to the surface of the piezoelectric crystal. In another mode, called a "3-3" mode, the axis of vibration is generally along the surface of the piezoelectric crystal. This property is extremely useful in generating a controlled shaking force to produce cavitation in the fluid material adjacent to the walls of the piezoelectric resonator.

As noted herein above, agitation of the fluid substance due to the piezoelectric action in the resonant chamber puts the fluid in motion. If the fluid is agitated vigorously enough at an appropriate frequency, the cavitation produces the vaporizing action that separates gaseous materials from the fluid. As a gross analogy, the process is somewhat akin to shaking a can of a carbonated beverage, which will enable the $CO_2$ mixed into the beverage recipe to escape.

Figure 10:
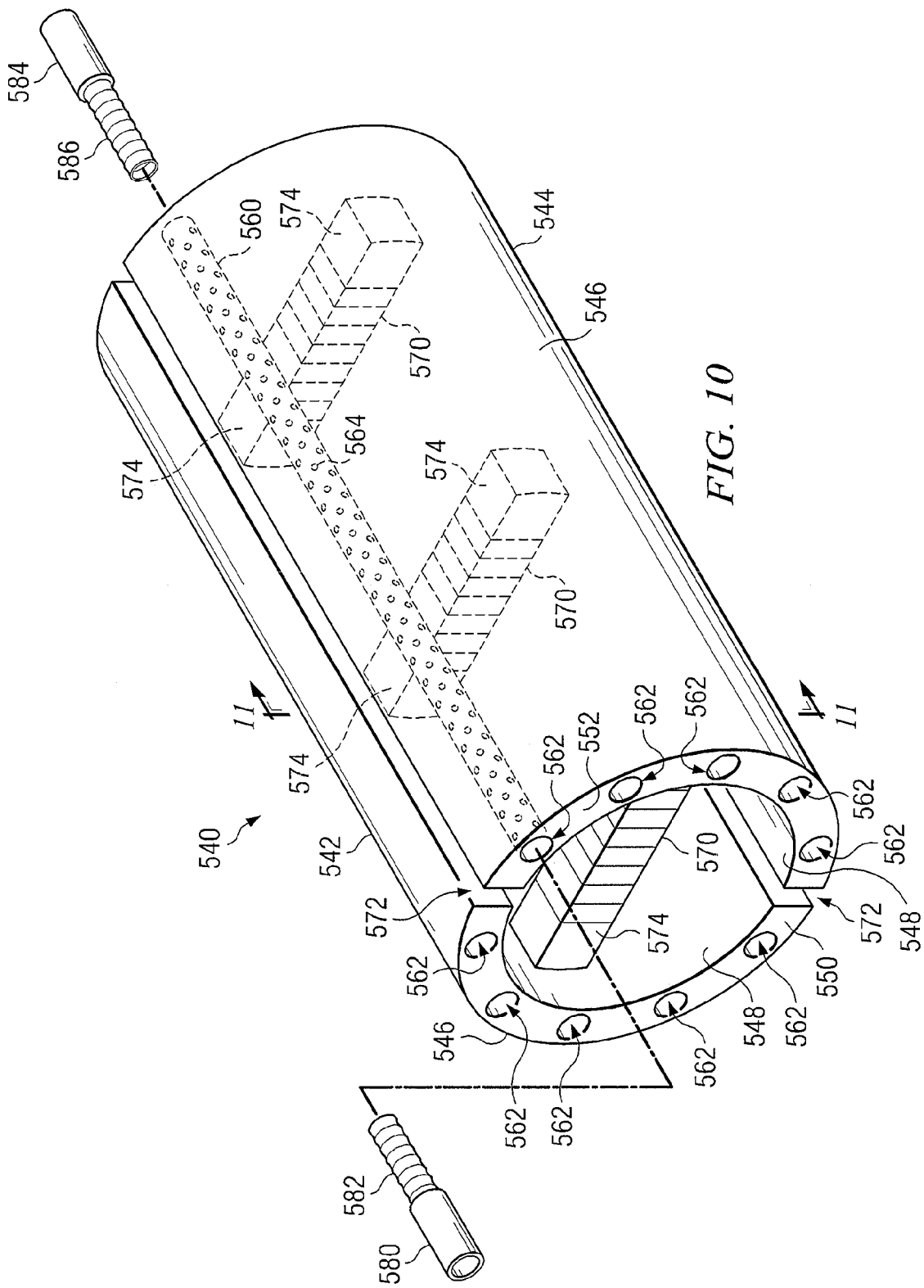
FIG. 10 illustrates a simplified perspective view of a portion of a first embodiment of a piezoelectric cavitation phase separator according to the present invention.
Figure 11:
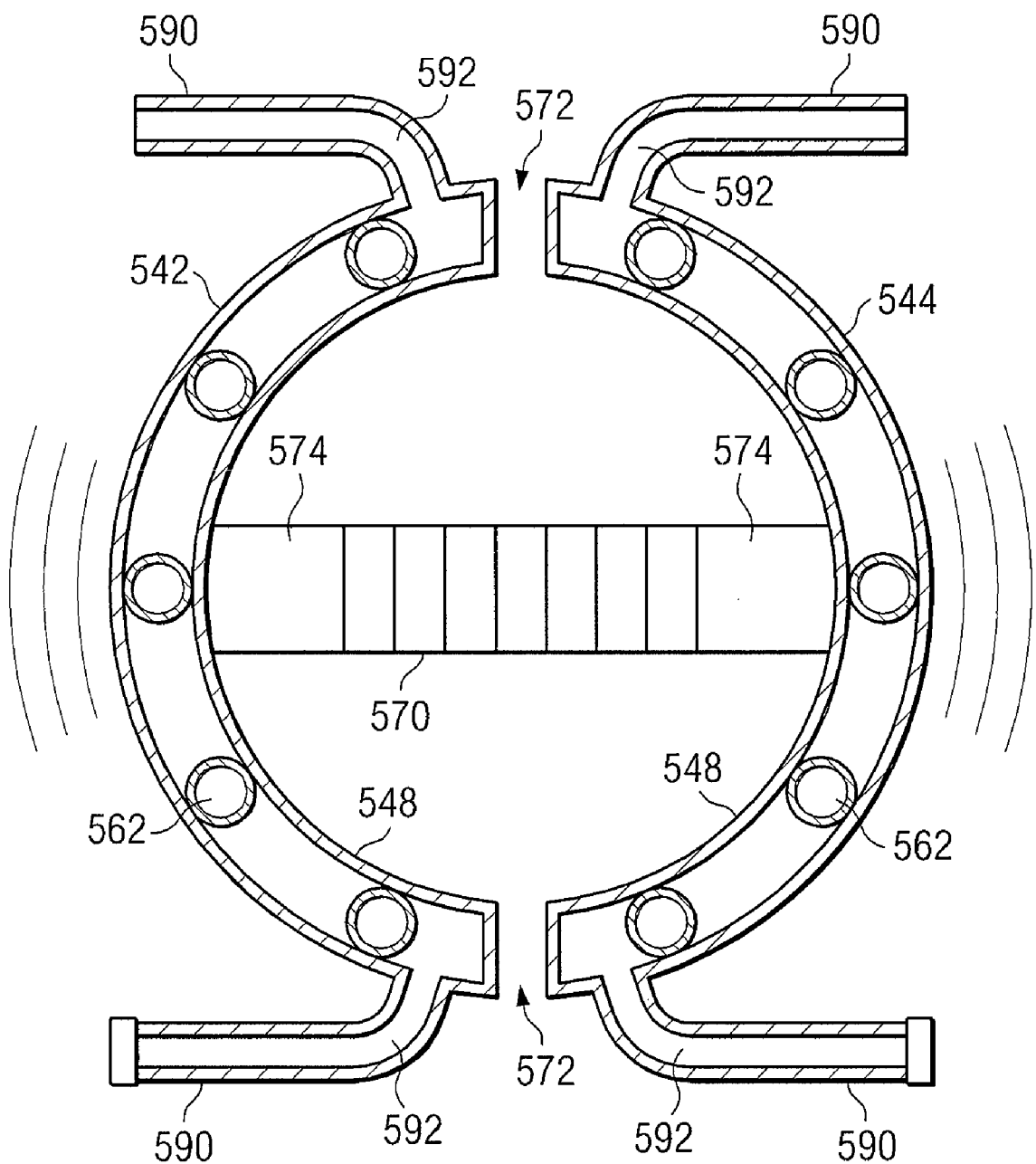
FIG. 11 illustrates a cross section view of the embodiment of FIG. 10.

One configuration of the phase separator, called a double-shell resonator, employs a linear piezoelectric stack that may operate in a 3-1 resonant mode. This embodiment is illustrated in FIGS. 10 and 11. The cylindrical cavity for this configuration includes a pair of slots cut through the wall of the cavity (from outside to inside diameter) along two opposite sides of the cylinder, from end to end, forming two semicircular shells whose concave sides face each other. The linear piezoelectric stacks (in this example three such stacks may be used, each resembling a stack of dominoes) are each oriented along and across a diameter of the cavity and at right angles to the plane containing the slots. When the piezoelectric stacks are energized at resonance, the two semicircular "sides" or shells of the cylinder, respectively attached to the opposite ends of the stacks, vibrate toward and away from each other, alternately compressing and expanding the volume of the cavity, and thus shake the contents of the fluid tubes attached to the outside of the cavity shells. The cylinder may be suspended by acoustically insulating supports.

Figure 12:
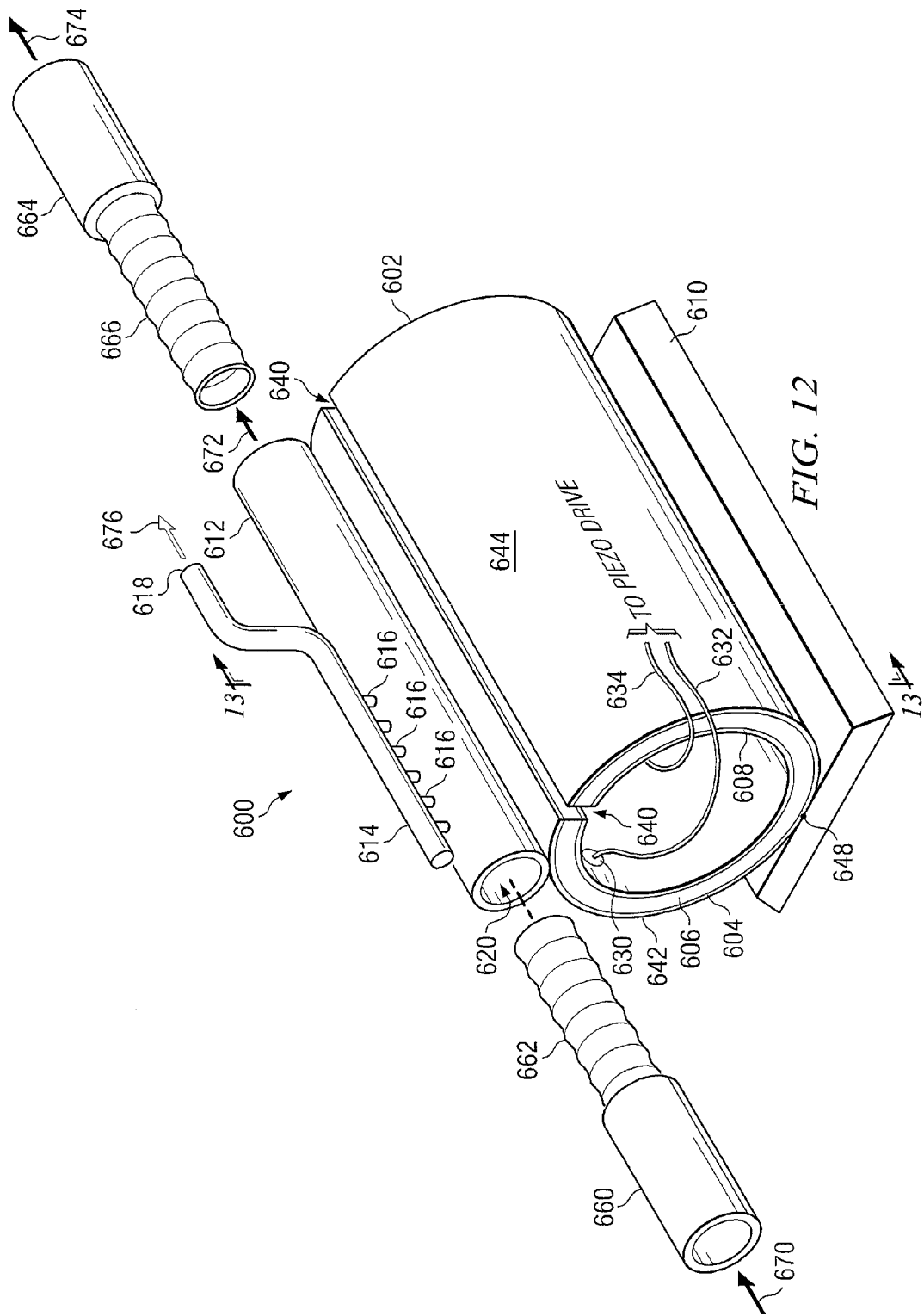
FIG. 12 illustrates a simplified perspective view of a portion of a second embodiment of a piezoelectric cavitation phase separator according to the present invention.
Figure 13:
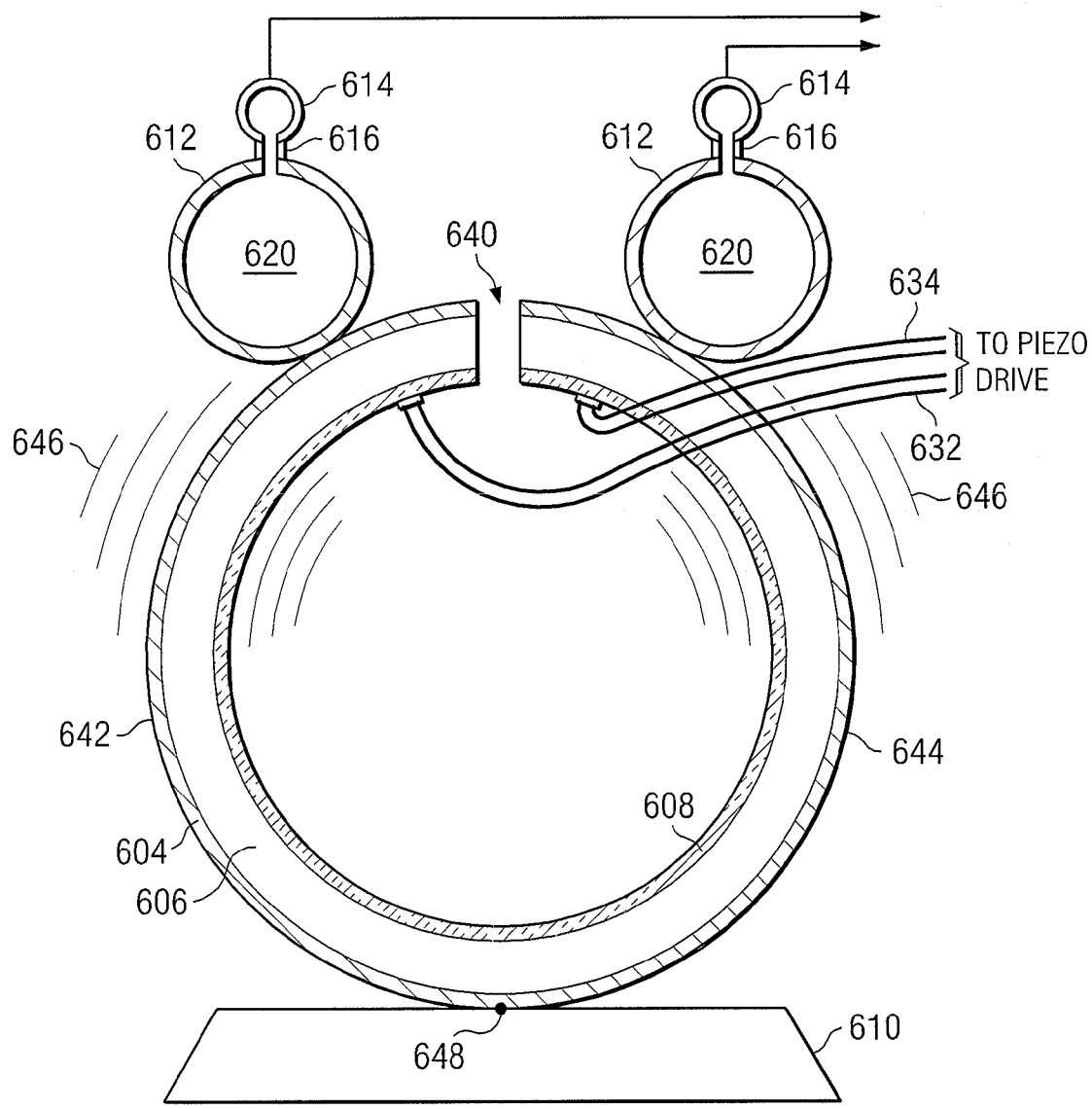
FIG. 13 illustrates a cross section view of the embodiment of FIG. 12.
Figure 14:
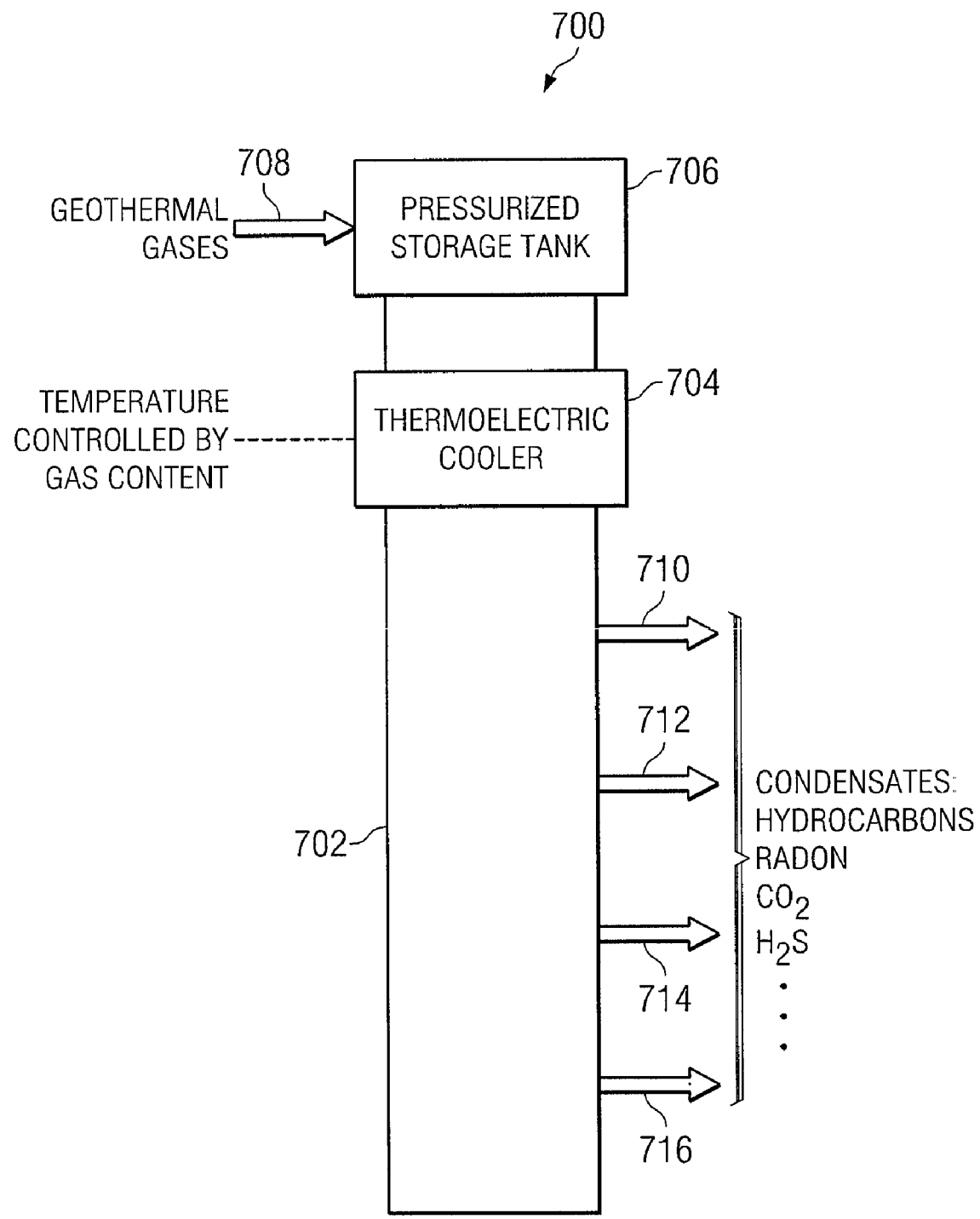
FIG. 14 illustrates a simplified block diagram of one embodiment of a pollution prevention cold trap according to the present invention.

The second type of phase separator configuration, illustrated in FIGS. 12 and 13, may be called in this context a single shell or tuning fork resonator in which the inside cylinder wall is lined with a thin-walled piezoelectric cylinder and may operate in either a 3-1 or a 3-3 mode. The cylindrical cavity includes a single slot cut through the cavity wall and the piezoelectric lining from end-to-end, parallel to its longitudinal axis, on one side of the cylinder only. Thus, in cross section, the cavity somewhat resembles a tuning fork having curved arms that vibrate toward and away from each other at the free ends, and about an imaginary pivot diametrically opposite the slot, thus shaking the contents of the fluid tubes attached to the outside of the cavity shell. The cylinder may be supported along the imaginary pivot, which is a part of the cylinder that does not vibrate.

It should be apparent that both cavitation resonators described above vigorously agitate the fluid contents in the manner of shaking a soda can, causing the material having a sufficiently low pressure—i.e., the gaseous constituents of the fluid—to be liberated and drawn off into storage receptacles or fed to a pollution prevention trap (to be described), as shown in FIG. 3. One suitable piezoelectric material is known as "Navy Type III," and the unit may operate in either a 3-1 mode or a 3-3 mode for piezoelectric transducers. In either case, the units may be kept cool by air flow or thermoelectric coolers added to the phase separator surface. As is well known, a thermoelectric cooler is typically a solid state "thermoelectric" device that may be used to "pump" heat away from one side of the device to another side when a voltage of the correct polarity is applied across the device. As the charge carriers in the device move under the influence of the applied voltage, heat is also transported away from a hot region of the device, which is in thermal contact with the CPS to a cooler region of the thermoelectric device.

Referring to FIG. 9, there is illustrated a simplified perspective view of a cavitation phase separator according to the present invention for use in the embodiment of FIG. 3. The cavitation phase separator 500 includes a cavitation chamber 502, a fluid inlet 504 coupled to the cavitation chamber 502 via a flexible tubing 506, and a fluid outlet 508, similarly coupled to the cavitation chamber 502 through a flexible tubing 510. The fluid 524 enters the chamber 502, where it is subject to vigorous shaking forces applied by a transducer 520 through a saddle 522. Fluid 526 that is substantially free of gases released by the cavitation action emerges from the outlet 508. Gases released by the cavitation action pass through ports 512 into a manifold 514 and are withdrawn from the manifold outlet 516 as free gases 528. The released gases may include vapors that responded to the cavitation action caused by the transducer 520.

FIG. 9 is provided to illustrate an elementary structure that applies a vigorous shaking force to a body of fluid or liquid substance, causing cavitation in the fluid or liquid of sufficient activity to cause the release of gases mixed—i.e., not chemically bound—in the fluid or liquid. The transducer 520 may be of any type that is capable of applying the appropriate vibrating force at a suitable frequency to an enclosure or chamber 502 containing the fluid or liquid 524. In the figure, a saddle component 522 may be used to couple the vibration of the transducer 520 to the chamber 502 containing the fluid or liquid 524. As is readily appreciated by persons skilled in the art, the walls of the chamber 502 must be sufficiently light-weight and stiff to efficiently impart the vibration force to the fluid or liquid 524 within the chamber 502. For example, the transducer 520 may be implemented by an electromagnetic device or motor. A loudspeaker is such a device, wherein an electromagnetic motor causes an acoustic radiating surface such as a light-weight conical or spherical or planar element coupled to the motor to vibrate at a particular frequency or range of frequencies. The transducer 520 may also be implemented by a piezoelectric component as described herein, which applies acoustic energy to the fluid or liquid 524 within the chamber 502. Mechanical transducers, such as a rotating cam operating against the chamber held against the cam under the tension of a spring may also be used, provided that it can efficiently sustain vibration of the chamber 502 at an appropriate frequency.

In the following descriptions of FIGS. 10, 11, 12, and 13, the piezoelectric cavitation phase separator will also be referred to as a "phase separator" or "PCPS," associated with a reference number in the figure being described. Referring to FIG. 10, there is illustrated a simplified perspective view of a portion of a first embodiment of a piezoelectric cavitation phase separator or PCPS 540 according to the present invention. The phase separator 540 in FIG. 10 is called a double-shell resonator and employs a linear piezoelectric stack 570 that may operate in either a 3-3 mode or a 3-1 resonant mode. The cylindrical cavity 544 for this configuration, formed by first 542 and second 546 double-walled "C" sections, includes a slot 572 through the wall of the cavity (from outside to inside diameter), and along each of two opposite sides of the cylinder 544, from end to end, forming two semicircular shells 542, 544 whose concave sides face each other. The two concave, semicircular shells 542, 544 are disposed relative to a common longitudinal axis in the view illustrated in FIG. 10. The longitudinal axis is not shown in FIG. 10 but is aligned with the center of the cylinder formed by the semicircular shells 542, 544. The linear piezoelectric stacks 570 (in this example three such stacks may be used, each resembling a stack of dominoes) are each shown oriented along and across a diameter of the cavity 544. In the view shown in FIG. 10, the linear piezoelectric stacks 570 are shown at right angles to the plane containing the slots 572, although the particular diametric alignment of the stacks 570 may differ from the right angle as shown. The two semicircular "sides," the first and second "C" sections 542, 546 of the cylinder, respectively attached to the opposite ends of the stacks 570 of piezoelectric resonators, vibrate toward and away from each other, alternately compressing and expanding the volume of the cavity, and thus shake the contents of the fluid tubes disposed within the double walls of the first 542 and second 546 sides of the cavity 544.

Continuing with FIG. 10, the piezoelectric stacks 570 connect to opposite interior walls 548 of each first 542 and second 546 sides of the cavity 544 via insulating blocks 574 at each end of the stack 570. the insulating blocks 570 may include terminals for connecting electrical wires for energizing the piezoelectric elements of the stack 570. It is preferable that the stacks be energized synchronously, which requires that the stacks all become resonant at the same frequency. The synchronous operation will consume less energy and more efficiently and completely liberate the gas materials from the fluid substances. The stacks 570 may be disposed at approximately uniform intervals through the length of the cavity 544. Each double-walled first 542 and second 546 side of the cavity 544 includes a plurality of fluid tubes 560 (only one is shown in phantom in the figure) spaced substantially uniformly around the inside space of the double-walled sides 542, 546. The longitudinal axes of the fluid tubes 560 are parallel with the longitudinal axis of the cavity 544. The fluid tubes 560 may be supported by respective first and second end bells 550, 552, which enclose the space 578 within the double walls of the first 542 and second 546 sides, and also function as inlet and outlet (at the end opposite the inlet end visible in FIG. 10) fluid ports 562 for the fluid substances to enter and exit the PCPS 540. Each of the fluid tubes 560 may be equipped with a plurality of gas orifices 564 along an upper side of their cylindrical walls to permit the escape of gas molecules from the fluid that is being agitated by the stacks 570 when they are energized. Coupled to the fluid ports 562 are flexible tubes 582, 586 which interface between the fluid inlet 580 and outlet 584 tubes carrying the fluid to be processed in the PCPS 540.

Referring to FIG. 11, there is illustrated a cross section view of the embodiment of FIG. 10. Structures shown in FIG. 11 that are the same as the structures described for FIG. 10 bear the same reference numbers. In addition, FIG. 11 illustrates the gas outlet manifolds 592 and the gas outlet ports 590 that are not shown in FIG. 10. The gases released in the PCPS 540 emerge through the gas orifices 564 into the space 578 within the double walls, and then escape through the gas outlet ports 590 into the gas outlet manifolds 592. The gas outlet manifolds 592 preferably convey the gas to a storage device (not shown in FIG. 11). The gas outlet manifolds 592 may also function as cleaning ports, wherein cleaning materials may be introduced to flush the interior portions of the PCPS 540 at maintenance intervals. The reference number 594 indicates the kind of motion imparted to the first 542 and second 546 sides of the PCPS 540 when the transducers 570 are energized. This motion is generally and primarily back-and-forth along a longitudinal axis of the piezoelectric stack 570. The motion thus applied to the first 562 and second 546 sides of the PCPS 540 imparts a vigorous shaking motion to the individual fluid tubes 560, causing sufficient cavitation to release the gases 528 from the fluid 524.

Referring to FIG. 12, there is illustrated a simplified perspective view of a portion of a second embodiment of a piezoelectric cavitation phase separator according to the present invention. This embodiment 600 of the PCPS may be called in this context a single shell or tuning fork resonator in which a transducer cylinder or body 602 includes a thin piezoelectric layer 606. The transducer cylinder or body 602 is a laminated structure having nested layers including an outer shell 604, the piezoelectric layer 606, and an inner insulating layer 608. The transducer 602, which forms a cylindrical cavity within it, further includes a single slot 640 disposed through the wall of the transducer cylinder or body 602 and the piezoelectric lining from end-to-end, parallel to its longitudinal axis. The single slot 640 in effect defines first 642 and second 644 sides or halves of the cylindrical body 602.

The piezoelectric layer 606 is driven by an electrical signal applied across the piezoelectric layer through conducting wires 630, 632 attached to conductive terminals 634 at a location on opposite sides or edges of the piezoelectric layer 606. An electrical drive signal of sufficient amplitude and having a frequency sufficiently close to the resonant frequency of the transducer 606 is applied through the connecting wires 630, 632. The transducer 606 is configured to vibrate such that the free edges of the piezoelectric layer on either side of the gap 640 alternately increase and decrease the width of the gap at the frequency of resonance, causing the two halves of the cylindrical wall to vibrate and shake the contents of the fluid tubes 612. Cavitation occurs, releasing the gas from the fluid. Thus, in cross section as seen in FIG. 13, the transducer 602 resembles a tuning fork having curved arms or sides 642, 644 that vibrate toward and away from each other at the free ends adjacent the slot 640, and about a fixed pivot axis 648 diametrically opposite the slot 640, thus shaking the contents of the fluid tubes 612 attached to the outside of the shell of the transducer cylinder 602. The cylinder 602 may be supported on a base 610 along the fixed pivot axis 648, which is a part of the cylinder 602 that does not vibrate. Like the embodiment described in FIGS. 10 and 11, the cylindrical body of the PCPS 600 functions as the transducer that imparts the shaking forces to the fluid enclosed within the plurality of fluid tubes 612. The fluid tubes 612 are preferably attached to the transducer cylinder 602 with their longitudinal axes parallel with the longitudinal axis of the transducer cylinder 602.

Continuing with FIG. 12, the fluid tubes 612 include a plurality of ports 614 leading into a manifold 616. Gases 676 released by the cavitation action emerge from an outlet 618, which may be coupled to a conduit leading to a storage device (not shown). Coupled to fluid ports 620 of each fluid tube 612 are flexible tubes 662, 666 which interface between the fluid inlet pipe 660 and the fluid tube 612 and between the fluid tube 612 and the outlet pipe 664. The fluid 670 entering the PCPS 600 for phase separation by cavitation passes the fluid 670 to be processed in the PCPS 600 through the fluid tubes 612, gives up the gas content through the orifices 614, and passes along the processed fluid 672 through the flexible tube 666 and the fluid outlet pipe 664 to be stored.

Referring to FIG. 13, there is illustrated a cross section view of the embodiment of FIG. 12. Structures shown in FIG. 13 that are the same as the structures described for FIG. 12 bear the same reference numbers. FIG. 13 also includes two manifold assemblies consisting of the fluid tube 612, a plurality of gas ports 614, and a gas manifold 616. One such manifold assembly is shown attached to an outer surface of each arm or side 642, 644 of the transducer 602. In addition, the reference number 646 indicates the kind of vibrating motion imparted to the of the PCPS 600 when the transducer 606 is energized. This motion resembles a low-amplitude vibration of the arms or sides 642, 644 about the fixed pivot axis 648, wherein the arms, corresponding to the sides 642, 644 of the cylinder 602 on either side of the gap 640, are curved as depicted in FIGS. 12 and 13. The motion thus applied to sides of the PCPS 600 imparts a vigorous shaking motion to the individual fluid tubes 612, causing sufficient cavitation to release the gases 676 from the fluid entering the fluid ports 620.

The Pollution Trap

As described herein above, the geothermal fluid produced from the earth is processed in a cavitation phase separator to remove gas phase substances from the fluid that will be used to convey heat energy into the renewable energy power plant system. In another step in processing the gas and vapor substances, these materials may be fed to a pollution prevention trap to separate the various different gases that may be present in the substances removed by the phase separator. The pollution prevention ("P2") cold trap included in FIGS. 3 and 14 (See P2 trap 106 and 700, respectively) is a well known device and thus will only be briefly described herein.

Referring to FIG. 14, there is illustrated a simplified block diagram of one embodiment of a pollution prevention cold trap for selectively recycling gases separated from said demand fluid according to the present invention. A simplified structure of a P2 cold trap 700 is shown in FIG. 14. In operation, geothermal gases from the phase separator may be stored in a pressurized tank 706 that serves as a reservoir. The reservoir 706, which may be disposed at a top-most portion of the pollution trap vessel 702, enables the removal of heat from the stored gases using, e.g., a thermoelectric cooler 704, followed by condensation of various constituents of the geothermal gases such as radon 710, hydrocarbons 712, $H_2S$ 714, $CO_2$ 716, etc. The gases, which tend to condense at varying temperatures and which also vary as to specific gravity, become liquid and may be diverted or drained into separate collection facilities. In this way, these materials, not needed in the power plant system, may be removed from the working fluids and separately contained for reuse, sale, recycling, etc.

In the renewable energy power plant described herein, the utilization of geothermal fluids for the thermal energy they bear, may be at least partially purified or cleansed through the CSP and the P2 trap processes described herein above. These processes are not unlike solution mining processes in which water, with or without other chemicals, may be pumped into deep subsurface wells to cause minerals or other deposits to become dissolved in the fluid, and the resulting leachate pumped to the surface for processing and recovery of the minerals or compounds of interest that are dissolved therein. Thus, the geothermal fluid pumped from the deep, hot deposits for use in the renewable energy power plant may contain a variety of minerals that have commercial value. Even if the amount of any individual mineral recovered is insufficient to justify a dedicated facility to mine it, the present system may nevertheless provide sufficient recovery of minerals in the aggregate as a parasitic process because of the necessity of cleansing the geothermal fluid prior to use in the renewable energy power plant.

Concluding Remarks

While the invention has been shown in only one of its forms, it is not thus limited but is susceptible to various changes and modifications without departing from the spirit thereof.

In the foregoing description, a number of novel additional components are employed in new combinations to enhance the efficiency of a basic binary cycle geothermal power plant. Among the new components are heat balancers with construction and design features to enhance heat transfer and introduce combustible gases into the working fluids; and phase separators that utilize cavitation as an efficient way to release gases mixed in the geothermal solutions. Among the new processes put to new uses are the electrolysis system to convert wind or solar-generated electricity to hydrogen gas, a form of energy that may readily be stored in tanks for later uses; and the injection of controlled amounts of combustible gases into the working fluids of a binary cycle power plant to enhance the plant efficiency. The inventions described herein draw on the technologies of geothermal power plants, electrolysis of water, steam turbine driven electric generators, hydrogen-fired steam boilers, cavitation systems, heat exchangers, programmable control systems, pollution prevention traps, etc., improving them and combining them in new ways to provide renewable energy power plants that are efficient and have very low emissions and carbon footprints.

By way of illustration, the combination shown in FIG. 3 is intended to illustrate the basic principles of the concepts of the present invention by showing the relationship of the various specific additional components. However, FIG. 3 is not necessarily a real operating renewable energy geothermal power plant. The components shown may be used in multiples (see, e.g., FIG. 5), depending on the number of turbine-generator combinations and the number of points throughout the system that the heat balancing, hydrogen injection, and cavitation phase separation (CPS) units are required to obtain the maximum operating efficiencies in a given application.

For example, in a system having three turbine generators, the input working fluid for each turbine may be subject to heat balancing and hydrogen injection. In other flow paths of working fluid, heat balancing steps may be used to advantage to optimize the temperature of the fluid in a particular path depending on its utilization. In another example, several turbine generating systems having varying capacities and/or even different heat energy sources may be combined to better adapt the overall system to changes in loading or variations in the availability of renewable energy resources. In one example, a first generator in the system may be optimized for a 1 to 10 Megawatt output. A second generator in the system may be optimized to produce an output ranging from 10 to 25 Megawatts. A third component generator in the system may, accordingly, be configured to optimally generate 25 to 100 Megawatts. FIG. 5 is presented herein above to illustrate on such embodiment. Moreover, each turbine generating component may employ a particular combination of heat balancing, heat sources, hydrogen injection, etc. to optimize its operation at the most efficient capacity. In another example, electricity may be generated from an alternative renewable source to the wind power generating system described herein.

Solar energy conversion, or even generation from ocean wave action are two possible alternatives for generating electricity to supply the electrolysis plant for producing hydrogen gas to be used in the various ways described herein above. In this way the power plant systems described herein above may be adapted to a wide variety of geographical, economical, environmental, and regulatory circumstances, within sufficient proximity to geothermal and wind or solar generating resources and electric power distribution networks. It is to be expected that, because of geographical and meteorological variations around the planet, that different combinations of the renewable and supplemental energy sources will be needed to fully and efficiently exploit the renewable energy resources available in specific locales.

Further, in some facilities, the fluid being returned to the injection well may be adjusted in temperature by heat balancing to facilitate injection into and maintain the temperature of the receiving strata. The same geologic receiving strata may physically be used to store heat because the insulating properties of the hot dry rock will allow for temperature storage of selected materials at extremely high temperatures, even approaching the thermal limit of the outputs of the boiler and the gas turbine. The hot materials may be pumped into selective directional holes drilled into the geothermal structure for energy storage and heat gathering.

Moreover, the system of the present invention offers a number of opportunities to recover minerals, gases, and other substances having commercial value through judicious application of the cavitation phase separator, P2 traps, precipitation basins, and associated devices, perhaps along with a solution mining unit and subsequent processing steps as outlined.

What is claimed is:

1. A method for enhancing efficiency of a steam-driven turbine generator combination, comprising the steps of:
   providing a hydrogen-fired boiler;
   providing for the supply of steam of a suitable temperature from said hydrogen-fired boiler to an inlet to said turbine generator combination;
   supplementing at least one operating parameter of said steam with injection of a controlled amount of hydrogen gas into said supply of steam downstream from said hydrogen fired boiler and upstream of said inlet to said steam turbine to optimize efficiency of said turbine generator combination;
   monitoring the effect of the at least one operating parameter in said turbine generator combination; and
   executing one or more program sequences of a control system to adjust said at least one operating parameter of said system in response to said monitoring step.

2. The method of claim 1, wherein the step of supplementing comprises the step of:
   injecting a controlled amount of hydrogen gas into said steam to adjust the energy density of the steam mixture for optimum efficiency of said turbine generator combination.

3. The method of claim 1, wherein the step of monitoring comprises the steps of:
   measuring the energy density of the steam fed to the turbine generator combination.

4. The method of claim 1, wherein the step of executing comprises the steps of:
   comparing, in said control system, a measured value of said operating parameter with a reference value; and
   adjusting said operating parameter to minimize the difference between said operating parameter and said reference value.

5. A method of storing and utilizing renewable energy without burning carbon-based fuels, comprising the steps of:
   generating electricity in a generator energized by a renewable, non-carbon energy source;
   converting the electricity to hydrogen in an electrolysis plant;
   storing the hydrogen in tank facilities for later use;
   utilizing said hydrogen in a hydrogen-fired boiler to generate steam;
   transferring heat energy from said steam from said boiler to a working fluid; and
   injecting a controlled amount of said hydrogen into said working fluid of said steam turbine for adjusting the energy density of said working fluid inlet to said steam turbine.

6. The method of claim 5, wherein the step of generating electricity comprises the steps of:
   generating electricity in a wind power generating facility; and
   delivering the electricity generated to an electric distribution grid.

7. The method of claim 5, wherein the step of generating electricity comprises the steps of:
   generating electricity in a wind power generating facility; and
   delivering the electricity generated to said electrolysis plant.

8. The method of claim 5, wherein the step of generating electricity comprises the steps of:
   generating electricity in a solar power generating facility; and
   delivering the electricity generated to an electric distribution grid.

9. The method of claim 5, wherein the step of generating electricity comprises the steps of:
   generating electricity in a solar power generating facility; and
   delivering the electricity generated to said electrolysis plant.

10. The method of claim 5, wherein the step of converting the electricity comprises the steps of:
    operating said electrolysis plant with electricity obtained from said wind power generating facility;
    dissociating hydrogen and oxygen gases from water in said electrolysis plant; and
    collecting said hydrogen and said oxygen gases.

11. The method of claim 5, wherein the step of storing comprises the steps of:
    storing collected hydrogen and oxygen gases in separate respective storage tanks.

* * * * *